US012730885B2

(12) United States Patent
Sankaran et al.

(10) Patent No.: US 12,730,885 B2
(45) Date of Patent: Sep. 8, 2026

(54) SECURITY THREAT MITIGATION

(71) Applicant: Microsoft Technology Licensing, LLC, Redmond, WA (US)

(72) Inventors: Anush Sankaran, Burnaby (CA); Srisuma Movva, Seattle, WA (US); Andrew White Wicker, Snoqualmie, WA (US); Muhammed Fatih Bulut, Cambridge, MA (US); Melissa Ailem, Los Angeles, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 18/393,652

(22) Filed: Dec. 21, 2023

(65) Prior Publication Data

US 2025/0209156 A1 Jun. 26, 2025

(51) Int. Cl.
*G06F 21/55* (2013.01)
*G06N 3/0475* (2023.01)
(Continued)

(52) U.S. Cl.
CPC ......... *G06F 21/554* (2013.01); *G06N 3/0475* (2023.01); *G06N 3/08* (2013.01);
(Continued)

(58) Field of Classification Search
CPC . G06F 21/554; G06F 2221/03; G06N 3/0475; G06N 3/08; H04L 63/1425; H04L 63/1441; H04L 63/20
See application file for complete search history.

(56) References Cited

U.S. PATENT DOCUMENTS 10,050,868 B2 * 8/2018 Porras ................. H04L 63/1491
10,418,036 B1 * 9/2019 Roturier ............. G10L 15/1822
(Continued)

OTHER PUBLICATIONS

International Search Report and Written Opinion received for PCT Application No. PCT/US2024/057584, mailed on Nov. 12, 2025, 15 pages.

(Continued)

*Primary Examiner* — Ramy M Osman
(74) *Attorney, Agent, or Firm* — Pillsbury Winthrop Shaw Pittman LLP

(57) ABSTRACT

The present disclosure provides methods, systems and computer readable media for training and implementing a generative machine learning model for identifying and mitigating security threats. Certain examples relate to generative model training, in which a training image is provided to a generative machine learning (ML) model in a training prompt, with an Indicator of Compromise (IoC) prediction instruction pertaining to the first security image. The model generates a predicted IoC and a parameter of the model is updated based on a loss function that quantifies error between a ground truth IoC and the predicted IoC. Other examples relate to the use of trained generative models for cybersecurity. A mitigation prompt comprising a second security image and an associated mitigation instruction is provided to a trained generative model. The model outputs an indication of a cybersecurity mitigation action based on the mitigation prompt, and the cybersecurity mitigation action is performed on the system. Certain example embodiments identify and automatically mitigate security issues using a multimodal generative model (MGM) though appropriate prompt engineering.

19 Claims, 13 Drawing Sheets

(51) Int. Cl.
*G06N 3/08* (2023.01)
*H04L 9/40* (2022.01)

(52) U.S. Cl.
CPC ...... *H04L 63/1425* (2013.01); *H04L 63/1441* (2013.01); *H04L 63/20* (2013.01); *G06F 2221/034* (2013.01)

(56) References Cited

U.S. PATENT DOCUMENTS 10,643,216 B2 * 5/2020 Sadaghiani ......... H04L 63/1416
11,757,907 B1 * 9/2023 Berger ..................... G06N 7/01 726/23
11,829,486 B1 * 11/2023 Lambotte ................. G06N 3/09
11,882,148 B1 * 1/2024 Hagen ................. H04L 63/1441
11,979,425 B2 * 5/2024 Thakur ............... H04L 63/1416
12,019,756 B1 * 6/2024 Donovan ............ G06F 9/45512
2007/0192865 A1 * 8/2007 Mackin ................... G06F 21/55 726/24
2008/0010225 A1 * 1/2008 Gonsalves ............... G06N 7/01 706/11
2013/0298244 A1 * 11/2013 Kumar .................... G06F 21/51 726/25
2016/0164919 A1 * 6/2016 Satish ................. H04L 63/1441
2016/0219048 A1 * 7/2016 Porras ................... H04L 41/147
2018/0146002 A1 * 5/2018 Canfield ............. H04L 63/1433
2019/0334933 A1 * 10/2019 Teshome ............... H04W 12/61
2022/0038489 A1 * 2/2022 Thakur .................. G06N 3/088
2022/0414463 A1 12/2022 Mittal et al.
2023/0009127 A1 * 1/2023 Boyer ................. H04L 63/1441
2023/0336573 A1 * 10/2023 Jones .................. H04L 63/1416
2023/0336574 A1 * 10/2023 Rozenbaum ............. G06N 3/08
2024/0045990 A1 * 2/2024 Boyer ..................... G06F 40/20
2024/0111665 A1 * 4/2024 Berko ................. G06F 11/3692
2025/0209156 A1 * 6/2025 Sankaran ............ H04L 63/1425
2025/0260708 A1 * 8/2025 Miron ................. H04L 63/1433
2025/0379885 A1 * 12/2025 Murphy ............... G06N 3/0475

OTHER PUBLICATIONS

Adam C, et al., “Large Language Models and Intelligence Analysis”, Retrieved From: https://cetas.turing.ac.uk/publications/large-language-models-and-intelligence-analysis, Jul. 5, 2023, 14 pages.
Bolanos, et al., “What is Semantic Kernel?”, Retrieved From: https://web.archive.org/web/20230711204340/https://learn.microsoft.com/en-us/semantic-kernel/overview/, Jul. 11, 2023, 7 pages.
Bolanos, Matthew, “Understanding the kernel”, Retrieved From: https://learn.microsoft.com/en-us/semantickernel/concepts/kernel?tabs=Csharp&pivots=programming-language-csharp, Apr. 16, 2025, 4 pages.
Driess, Danny, “Palm-E: An Embodied Multimodal Language Model”, Retrieved From: https://research.google/blog/palm-e-an-embodied-multimodal-language-model/, Mar. 10, 2023, 10 pages.
Ferrag, et al., “Revolutionizing Cyber Threat Detection with Large Language Models: A privacy-preserving BERT-based Lightweight Model for Iot/IIot Devices”, In Repository of arXiv:2306. 14263v2, Feb. 8, 2024, 16 pages.
Geib, et al., “Microsoft Threat Modeling Tool”, Retrieved From: https://learn.microsoft.com/en-us/azure/security/develop/threat-modeling-tool, Aug. 25, 2022, 2 pages.
Huang, et al., “Language Is Not All You Need: Aligning Perception with Language Models”, In Repository of arXiv:2302.14045v2, Mar. 1, 2023, 26 pages.
Lemos, Robert, “Large Language AI Models Have Real Security Benefits”, Retrieved From: https://www.darkreading.com/cyber-risk/large-language-ai-models-have-real-security-benefits, Aug. 3, 2022, 4 pages.
Saxe, et al., “GPT-3 and Me: How Supercomputer-scale Neural Network Models Apply to Defensive Cybersecurity Problems”, Retrieved From: https://i.blackhat.com/USA-22/Wednesday/US-22-Saxe-GPT3-and-Me.pdf, Aug. 10, 2023, 53 pages.
Shostack, Adam, “Security Briefs—Getting Started With The SDL Threat Modeling Tool”, Retrieved From: https://learn.microsoft.com/en-us/archive/msdn-magazine/2009/january/security-briefs-getting-started-with-the-sdl-threat-modeling-tool, Jan. 2009, 10 pages.
Wei, et al., “Language Models Perform Reasoning via Chain of Thought”, Retrieved From: https://research.google/blog/language-models-perform-reasoning-via-chain-of-thought/, May 11, 2022.
Yin, et al., “A Survey on Multimodal Large Language Models”, In Repository of arXiv:2306.13549v4, Nov. 29, 2024, 18 pages.
Zhang, et al., “Multimodal Chain-of-Thought Reasoning in Language Models”, In Repository of arXiv:2302.00923v1, Feb. 2, 2023, 18 pages.
International Preliminary Report on Patentability (Chapter I) received for PCT Application No. PCT/US2024/057584, mailed on Jul. 2, 2026, 09 pages.

* cited by examiner

SECURITY THREAT MITIGATION

FIELD

The present application relates to the field of cybersecurity.

BACKGROUND

During active security incident investigation and threat hunting in respect of computer systems and services, cybersecurity analysts may gather and analyze material referred to herein as 'fusion content' to document their discoveries. This fusion content includes detailed descriptions of threat actors and/or activity profiles, e.g., methodologies used by the threat actors when attempting to attack a system or service. Human analysists are required to analyze complex systems often under time pressure as threats develop in realtime. Visual representations are often used to assist analysts. For example, security reporting tools are able to automatically generate a range of image content designed to assist human analysts during incident investigation or threat hunting, together with detailed textual context. For example, when a detector deployed within a system detects a potential threat, a reporting tool may automatically generate an image(s) visualizing the detected threat and related context, such as associated entities (e.g. devices, network addresses, users, services etc.) and/or activities, sometimes accompanied by explanatory text. Such content may be used by a human analyst responding to a threat, possibly along with other content, such as manually gathered content (e.g., screenshot images and/or text extracts gathered during the investigation process).

SUMMARY

The present disclosure provides methods, systems and computer readable media for training and implementing a generative machine learning model for identifying and mitigating security threats. Certain examples relate to generative model training, in which a training image is provided to a generative machine learning (ML) model in a training prompt, with an Indicator of Compromise (IoC) prediction instruction pertaining to the first security image. The model generates a predicted IoC and a parameter of the model is updated based on a loss function that quantifies error between a ground truth IoC and the predicted IoC. Other examples relate to the use of trained generative models for cybersecurity. A mitigation prompt comprising a second security image and an associated mitigation instruction is provided to a trained generative model. The model outputs an indication of a cybersecurity mitigation action based on the mitigation prompt, and the cybersecurity mitigation action is performed on the system. Certain example embodiments identify and automatically mitigate security issues using a multimodal generative model (MGM) though appropriate prompt engineering.

BRIEF DESCRIPTION OF THE DRAWINGS

To assist understanding of the present disclosure and to show how embodiments may be put into effect, reference is made by way of example to the accompanying drawings in which.

In the drawings, corresponding reference characters indicate corresponding components. The skilled person will appreciate that elements in the figures are illustrated for simplicity and clarity and have not necessarily been drawn to scale.

It will be appreciated that where reference numerals of the form xxx-a, xxx-b etc., are used to denote a particular instance of a feature of a drawing, the same reference numeral without a specified letter suffix (e.g., a, b, etc.) may denote a generic instance of the same feature.

DETAILED DESCRIPTION

Figure 1:
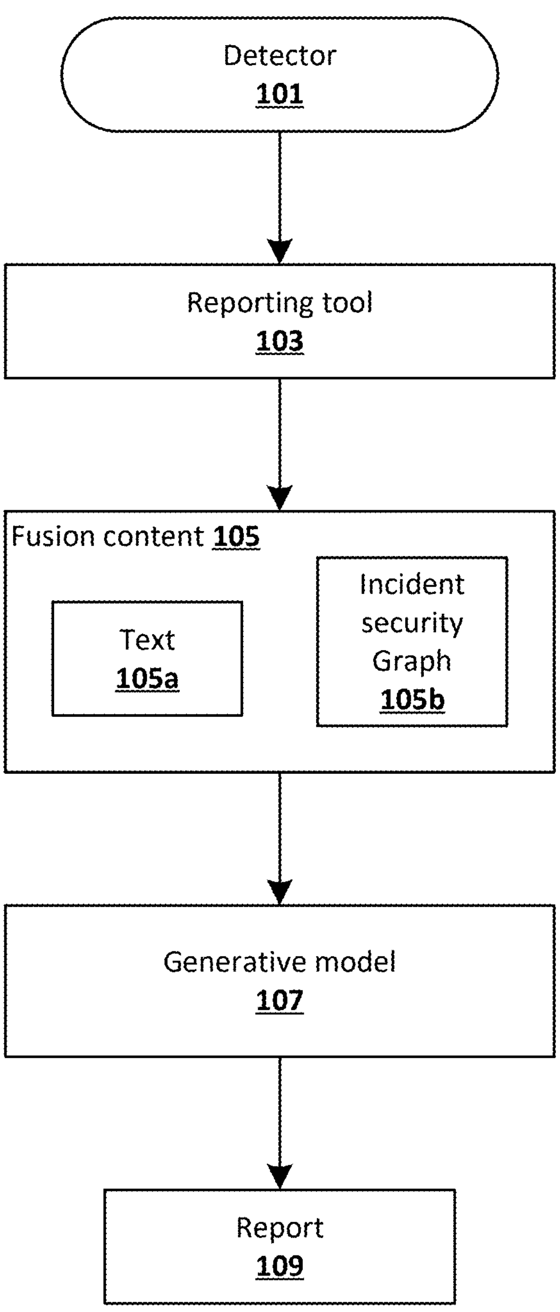
FIG. 1 is a block diagram of a system for automatically determining a mitigation action in response to a security alert.

Human error by cybersecurity analysis can result in security vulnerabilities being left open for attackers to exploit. During ongoing incident investigation, attackers may be able to outpace human analysists, who are limited in the speed they operate. The human investigation process can also be inefficient, with human analysts pursuing avenues of investigation that turn out to be uninformative. In embodiments described herein, bespokely-trained generative machine learning (ML) tools are used to automatically or semi-automatically respond to detected security threats. By reducing reliance on human analysis, speed may be increased and human error reduced, culminating in improved security. Improved efficiency is also achieved by streamlining cybersecurity analysis processes compared with conventional manual analysis.

The described embodiments utilize 'security images' that are inputted to a generative ML model with image processing capabilities. Certain embodiments utilize a multi-modal generative models having both image processing and text processing capabilities. The term 'security image' is used herein to refer to an image that is generated or collected in response to a detected cybersecurity threat (or potential threat). The generative ML model is promoted to determine an appropriate cybersecurity mitigation action based on a security image(s) visualizing a detected threat(s). For example, in one embodiment, the generative ML model is prompted to automatically synthesize computer-readable code (e.g. in the form of an automation script), which is configured, upon execution, to cause the cybersecurity mitigation action to be performed.

In the aforementioned context, a challenge arises in the need to embody the generative ML model with adequate domain-specific knowledge to enable it to determine appropriate mitigation actions accurately and reliably. Conventional 'off-the-shelf' generative models may have insufficient domain-specific knowledge to perform this task accurately and reliably, which in turn leads would result in reduced security through missed or inappropriate mitigation actions. To address this challenge, a bespoke training mechanism is described herein, which may be used to train a generative ML model from scratch or fine-tune an existing generative ML model. Examples herein comprise a series of steps, wherein use of a generative model may form a final step. New forms of multi-modal inputs described herein are considered novel. Further, exemplary processing features for handling multimodal data are also considered to be novel. A suitable training set is generated by gathering a variety of cybersecurity-related image content, along with accompanying text content in some cases, which is automatically labelled with ground truth 'Indicator of Compromise' (IoC) labels. Such content may be collected from a variety of sources, such as cybersecurity articles, blog posts etc. In some cases, IoCs may be explicitly indicated in such content (e.g. in cybersecurity blog posts/articles that are indexed with relevant keywords or keyphrases), or extracted automatically from the text context e.g. using predetermined rules or existing text-based ML classification models or ML information extraction models. During training, the generative ML model is prompted to identify any IoCs present in images or multi-modal inputs in the training set, and parameters of the generative ML model are tuned to reduce a measured error between the predicted IoCs and the ground truth IoCs. That is, during training, the system provides as output both IoCs and mitigation actions such as specific scripts. In this manner, the generative ML model gains domain-specific cybersecurity knowledge. Once trained, the generative ML model is able to apply this domain-specific knowledge to other tasks, such as identifying specific mitigation actions in response to detected threats (or potential threats) and synthesizing code to implement such actions automatically. During the training, the model may be given both input (text+image) and ground truth output (IoCs and other mitigation actions) and may learn billions of parameters so that the model can predict IoCs for new text+image input. There may be two steps, e.g., first training steps where the training data (both input and output) are provided to the model, and a second test step (inference step) where after the model finishes its training, it can predict the outputs for a given input (text and image).

Examples of security images include security incident graphs, attack chain diagrams, bar/line plots, network graphs, maps, source code and screenshots collected during initial investigation stages (e.g. by a human). Examples of bar/line plots may include time series line plots to show a number of cyber attacks or incidents over a given period. Bar charts may, for example, compare a number of cyber security incidents by type (e.g., malware, phishing, DDoS), or by industry sector. Another example type of bar chart may show a distribution of attack methods within a specific timeframe. For instance, histograms may represent a frequency of incidents having different threat severity levels. Network graphs may visualise relationships and connections between different security entities. For example, a network graph may map connections between various devices, users, or IP addresses in a cyber attack. Examples of such maps include chloropleth maps, which use colour gradients to visualise a concentration or intensity of cyber threats in specific regions. Other examples include network maps that show connections between entities in a network, such as servers, devices and users; these maps may help to visualise structures and potential vulnerabilities of a network. Further examples include geographical distribution maps, which illustrate a distribution of threat actors and cybersecurity events across different regions. Geographical distribution maps may help analysts and readers to understand a geographical scope of a cyber threat. Visual security incident graphs have been used by cybersecurity analysts to generate incident summaries, to identify malicious threat actors involved in investigations, as well as to infer additional threat hunting steps to carry out during incident investigations. Such content often has to be prepared or collated manually by human analysis working under time pressure. Such activity is normally carried out in respect of deployed systems/services, often in response to a developing attack that is still in progress. Such activity could also be carried out pre-deployment, for example in response to simulated attack designed to test preparedness. It will be understood that source code may be shown in images in cyber security blogs and threat intelligence reports, and may therefore be referred to as an image.

Figure 5:
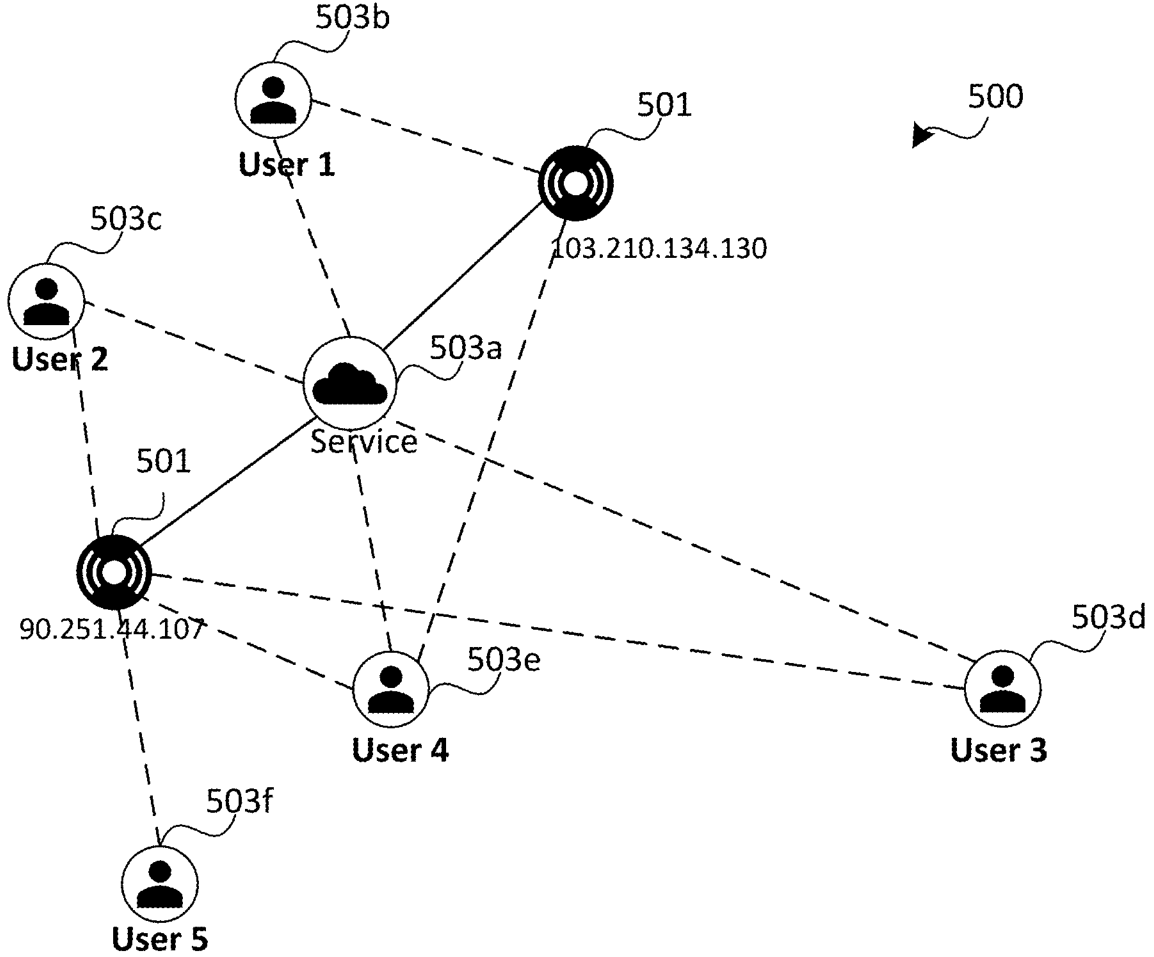
FIG. 5 shows an exemplary security incident graph.

A security incident graph is typically built to represent an alert connecting to its associated entities in the system or service. Security issues related to the system or service may be identified based on the features of the system illustrated in the graph, and in the way that those features are interlinked. FIG. 5 shows an example of a security incident graph, which is described in more detail later herein. Security graphs may be constructed based on telemetry data generated by devices hosting or communicating within the system, e.g., devices hosting or using the service. A security graph may, for example, be created in response to a positive threat detection (such as a suspicious or potentially suspicious behavior pattern, or the detection of a potentially malicious entity such as a malware pattern), referred to as an 'alert' herein. An alert node may be created, and the graph built by connecting related entities to the alert. However, the terminology extends more generally to any forms of security incident graphical representation. A security graph or network graph is a visual representation of relationships and connections between various security entities within a network. Entities in a security graph network may include users, IP addresses, devices, applications, and other relevant components of a network. These entities may be involved in network security monitoring and threat detection.

Security incident graphs are useful in enabling security analysts to thoroughly investigate open or closed security incidents and remediate them. As cybersecurity analysts engage with the security incident graphs, their objective is, for instance, to extract relevant entities associated with a given alert and to identify if any entity involved is malicious or compromised. Making inferences directly from security incident graphs can be very challenging for cybersecurity analysts, as it often involves sifting through extensive amounts of incident details provided in textual form. It may be the case that only a subset of entities associated with an alert have actually been compromised.

To address this particular problem, in one example below, a multi-stage prompt engineering strategy is used at runtime, in which a generative ML model is initially provided with a security image comprising one or more alert nodes and associated entities (such as users, devices, services etc.) connected (directly or indirectly) to the alert node. Accompanying text may also be provided. The generative ML model is prompted to initially map each alert to a subset of one or more entities (such as compromised entities) determined to be relevant to the alert. Typically, this will not be all of the entities associated with the alert (though occasionally it may be). The model is further prompted to use such identified mappings to identify an appropriate mitigation action. In some examples, the model is promoted to generate a report detailing the action alone with relevant contextual information, e.g. a multi-modal report containing both text and images. The model is further prompted to generate an automation script for implementing the action automatically (e.g., based on the report that provides additional context to enable the script to be generated reliably).

Figure 2:
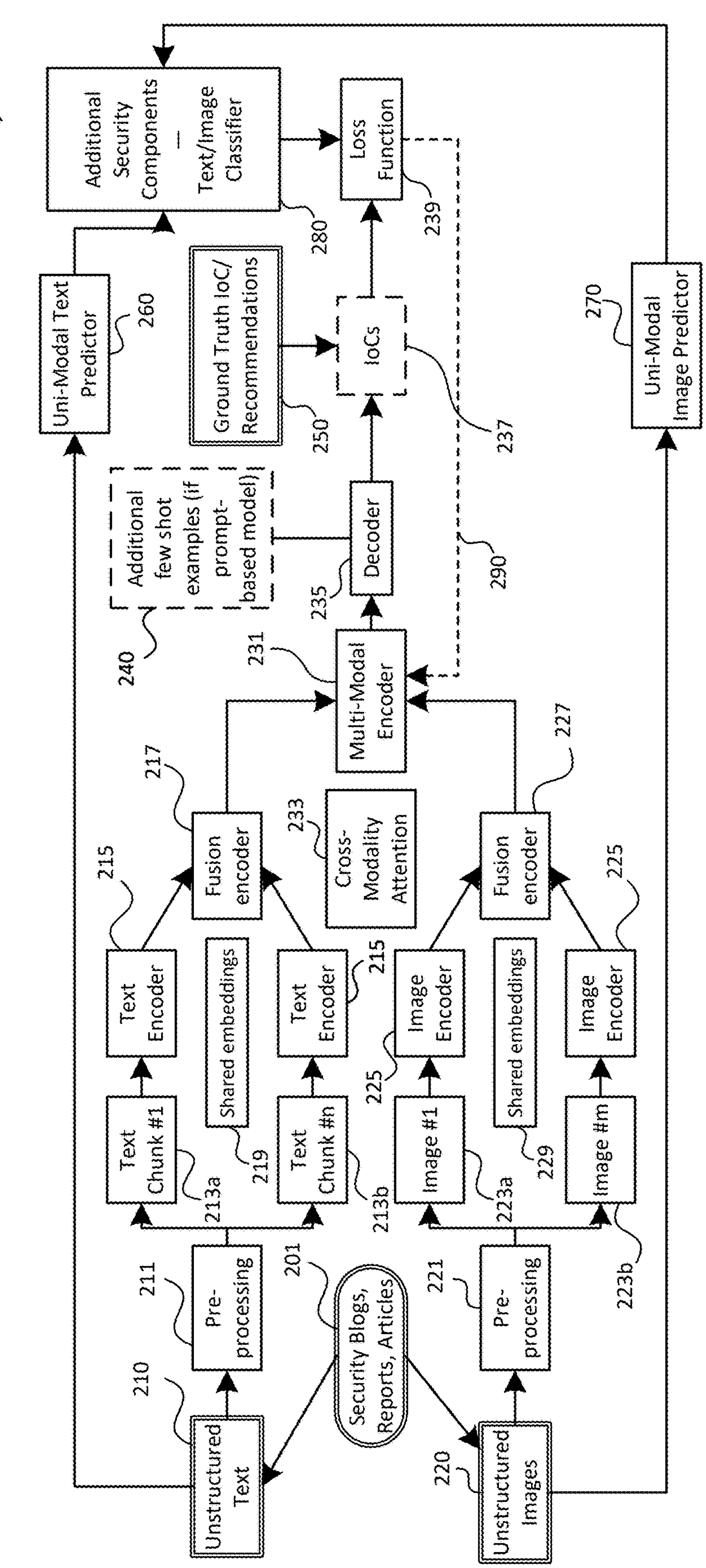
FIG. 2*a* shows a highly schematic diagram of a fine-tuning process for an generative machine learning (M) model, according to some examples.
FIG. 2*b* shows a highly schematic diagram of a trained generative ML model deployed at runtime, according to some examples.
FIG. 2*c* shows a highly schematic block diagram illustrating an example training architecture for a multimodal generative ML model.

Examples of the present disclosure continually train a multi-modal generative model (MGM) to reason about the visual and text representations of these security incident text and images, such as multi-modal content generated by security reporting tool(s). Various examples below may be implemented using generative multi-modal large language models (MLLMs), but the description applies equally to other forms of MGM. Though reference may be made to MGMs in the examples below, non-generative models may be used for some purposes. In the examples below, representation learning, i.e., learning the context and meaning of input multi-modal data, may be conducted using non-generative models. Representations (embeddings) may be learned using a non-generative MLLM. Non-generative models may also be used for classification purposes. That is, in the examples below, a non-generative model may be used to extract information from a security report and the embeddings, such as IoC and other meta information show described with reference to FIG. 2. For generations of incident reports, as described in more detail later, a generative model or decoder model may be used.

A multi-modal model is a model whose inputs and/or outputs include more than one modality (e.g., text and images). The term 'large language model' typically refers to a language model that has a high number of parameters, some containing over 100 billion parameters. Certain large language models (such as Generative Pretrained Transformers) are based on a transformer architecture. As described in more detail below, generative AI techniques may be implemented in the examples below.

Among other things, generative models may, for example, be used to perform rich semantic classification. For example, whereas a discriminative classification model might be trained over a predetermined set of classes (meaning it is limited to classification within those classes), a generative model configured to generate a variable length text sequence is able to assign a semantic classification label to an input based on semantic relationships it has learned in training. Generative models can be applied to other reasoning tasks, such as generating security incident reports comprising text and/or images.

In various examples herein, multi-model security incident prompts (e.g., comprising security incident graphs, text describing security incidents etc.) are provided to an MGM in a prompt (or prompts), which instruct the MGM to generate a security incident report within various parameters defined in the prompt(s). The description below is provided with reference to FIG. 1, which is a highly schematic block diagram that illustrates a process of generating a security report according to some examples herein.

Images and text that are processed by an MGM according to examples herein may be generated by security tools which are configured to automatically generate images and text when alerts are triggered that are conventionally intended for a human analyst. That is, a detector 101, which may be implemented on a computer device, may detect an alert by positively detecting a cyberthreat to a system or service. Detection of the alert causes a reporting tool 103 to generate fusion content 105, the fusion content comprising text data **105*a* and a security incident graph 105*b*. The reporting tool 103 may form part of the detector 101. The text data 105*a* may describe details of the alert, entities (e.g., users, devices etc.) involved, and the security incident graph may visualise relationships between entities and the alert, as described above. The text data 105*a* and security incident graph 105*b* are mapped, for example, to threat actors and/or attack methods used by threat actors. To generate such mappings at runtime, an MGM 107 may be trained by consuming data that indicates correlations between multi-modal inputs collected from various sources and so-called 'indicators of compromise' (IOCs) associated with those inputs. Outputs of the trained MGM 107 at runtime comprise an indication of a cybersecurity mitigation action 109, which may for example be contained in a generated report. The generated report may comprise generated text and image data that details the threat, including what happened, how it happened, and provides mitigation and prevention details. The report may include diagrams to detail the architecture of the system/app where attackers gain access to the environment. The report 109** may comprise an indication of a cybersecurity mitigation action, as described in more detail below. Outputs of the trained MGM be used in active security investigation to prevent occurrence of attacks in future, mitigate the risks posed by a future incident, and later automate updates to the system to improve system security. This enables the automation of threat hunting and investigation processes for analysts, as well as implementing the determined mitigation actions themselves.

Classification that is not constrained to pre-determined classes is one example of a so-called "general-purpose artificial intelligence" (GPAI) function. A general purpose model can be applied at runtime to tasks that are not necessarily directly reflected in its training or training set. As another example, a generative model can be tasked at runtime with generating a security incident report based on a security incident prompt. It is feasible to use a generative model to carry out this specific task even if it has not been exposed during training (or has had only limited exposure in training) to that task and to examples of those specific types of input-output pairs. Of course, it may be possible to improve a model's performance by increasing its exposure to application-specific inputs-output pairs in training, but a general purpose model nevertheless has the ability extrapolate knowledge learned from different (e.g. more 'generic') inputs/outputs during training. Thus, a generative model may be trained, at least in part, on a classification task based on diverse inputs (such as text/images extracted from blog posts, articles, security frameworks and the like) associated with ground truth IOCs. During training on the classification task, the generative model is provided with the training inputs and is prompted to identify in its output any indicators of compromise present in those inputs (the predicted IOCs). Parameters (e.g. weights) of the generative model are tuned systematically to reduce error between the predicted IOCs and the ground truth IOCs. Whereas a more conventional discriminative machine learning model trained in this manner would be subsequently limited to the same classification task at runtime, a generative model has greater ability to extrapolate knowledge learned on such training tasks to other runtime tasks.

At runtime, a distinction is made between 'zero-shot' prompts and 'one-shot'/'few-shot' prompts. A zero-shot prompt instructs a generative model to perform a particular task, without providing any specific examples of input-output pairs. For example, a zero-shot prompt might instruct the generate model to list any IoC present in a given multi-modal input. This is wholly reliant on the model's semantic interpretation of the prompt and its understanding of the content of IoCs learned in training. One the other hand a one-shot or few-shot prompt gives one or more example input output pairs in the prompt itself, for example by including some example text and image extracts, together with an indication of any IoCs they contain in the prompt itself, which the model can use to supplement its learned knowledge. Note, in contrast to more conventional training, these additional example input-output parts are provided to the trained model at runtime (rather than during training).

A 'chat' refers to an ongoing session with a generative model, in which one or multiple prompts are provided to the generate model. A history of earlier prompt(s) and model response(s) in the chat is maintained, and is accessible to the generative model as context when processing subsequent prompt(s).

As described in more detail later herein with reference to the drawings, an MGM tailored for the security domain is trained. This involves curating a dataset that contains training fusion documents, including both training images and training texts, by collecting diverse training samples including security graphics, text instructions, and associated ground truth responses from existing resources. Ground truth responses may represent 'true' reference answers that a user would like the MGM to provide as output to a multi-modal input. The inputs and their corresponding output ground truths are used during training. For instance, a ground truth answer may provide an exact mitigation action to handle a threat intelligence. This type of content (mitigation actions) are often provided in threat intelligence reports. The ground truth may be prepared in multiple ways. Ground truth may be human provided, derived from previous blogs, or extracted from public benchmark datasets.

Finetuning this data set may therefore comprise a manual exercise in taking blog posts and articles, security knowledge bases (such as security frameworks designed for use by analysts) etc. in which indicators of compromise—i.e., evidence of a security-based compromise, are defined and identified accurately to define a ground truth.

The MGM may be trained with a multimodal encoder architecture that combines features of different modalities (such as text and image representations) into a shared multimodal embedding vector space. That is, shared embeddings may be generated, wherein embeddings representing text or images are embedded in the same vector space. Image and text representations may be computed independently. A shared embedding may then be projected into a lower-dimensional space using, for example, a variational autoencoder (VAE). Parameters of the MGM and the VAE may be learned simultaneously during training.

In one embodiment, features of different modalities (such as text and image) are combined into the shared embedding space through simple concatenation. In another embodiments, a cross-attention mechanism is used to combine such features. An attention mechanism calculates 'soft' weights for each embedding. These soft weights may change at runtime as more embeddings are defined. Attention mechanisms have been used in the field of textual analysis to identify, for example, the highest correlations between words in a given sentence.

Examples of the present disclosure provide an augmented attention mechanism that incorporates a learned weighting function to explicitly weight features of different modalities by relevance. The mechanism may balance text and image data, and improves performance when one modality is more relevant than the other.

In the context of textual data, the idea of attention mechanism is to assign an importance weight for each input token, to tell the model where to focus when generating an answer. In the context of multimodal input (text+images), several multimodal attention mechanisms may be used.

Embeddings Concatenation is a first example. This technique comprises concatenating an input image embedding with each token embedding of the input sequence. This concatenated representation is then fed to a variational autoencoder to obtain a lower dimensional representation that can be used for the attention mechanism.

Cross modal attention is a second example. This example comprises applying the attention mechanism separately to the text and image embeddings and allowing the attention weights of the different modalities to influence each other.

Gating mechanisms are a third example. This technique comprises introducing a learnable parameter p (a scalar value between 0 and 1), using p to determine the weight assigned to the textual modality and $1-p$ for the image modality (or vice versa). The technique involves applying attention mechanisms separately to the textual and image embeddings, using the weights determined by p and $1-p$. During training, model is able to learn the optimal value for p through backpropagation. The training process adjusts p based on the task's objectives, effectively learning when to focus more on text or images.

Furthermore, examples herein provide additional terms in an objective function, in order to meet security requirements from the model such as classification components for threat detection. This may improve an ability to assess whether a given security incident graph represents a security risk.

It will be appreciated herein that training of the MGM may not be limited to pretraining from scratch. Continual training of existing MGMs or finetuning of the same may be implemented.

'Pretraining' of a large language model may refer to the process of learning weights of the model from scratch (with initialized random weights). The model may interact with any data for the first time and learn to represent the data it is learning. This process is task-agnostic and considered as a feature extraction step. There is no need for labelled data for pretraining the model.

'Continuous/continual pretraining' of a large language model may refer to the process of continuing to pretrain (by learning features) a model on a niche domain/data. The model may already have learnt data features from generic data (such as WikiCorpus), but now may be further pretrained to learn features from domain-specific data (such as log data, financial records, medical data etc. in the present examples). This process is also task agnostic. I.e., the model is not trained to solve a specific task. There is no need for labelled data for continuous pretraining of the model.

'Fine Turning' of a large language model may refer to the process of transferring the learnt features to solve a particular task in a specific domain. There is a requirement for labelled data for fine tuning the model. Thus, the cost of data collection is higher, and the volume of data is multi-fold smaller than the data used for pretraining the model.

Figure 2A:
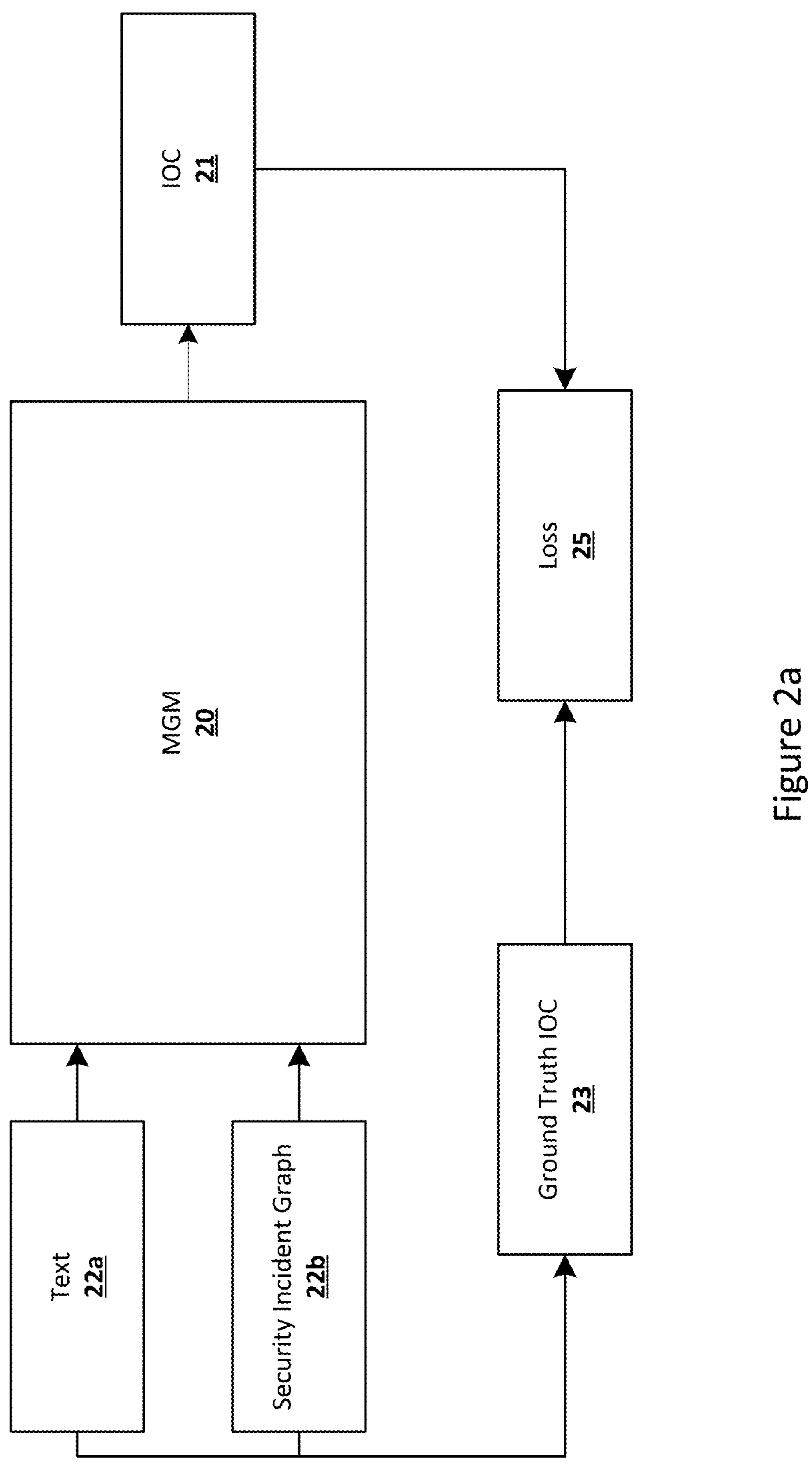

In an offline data mapping process, one or more mapping fusion content item, including images and text, and describing the details of threat actors and methodologies used to perform the attack, may be provided to the MGM as an input to generate a list of indicators of compromise (IoCs) associated with the input fusion content. IoCs capture the essence of the threat and threat actors. Since training involves consuming correlations between input and IoCs, the model may extract details efficiently and effectively. The offline data mapping process may refer more generally to data preparation steps, including data extraction, data cleaning, data pre-processing, and label preparation (training set creation). Reference is made to FIG. 2*a*, which is a highly schematic block diagram that represents a finetuning training process implemented at an MGM. FIG. 2*a* is described in more detail later herein.

The term IoC may be used herein to refer to an indication of a distinct type of cyberthreat in a computer system or service, such as a threat indicator (TI) relating to a particular type or category of cyberthreat. Indicators of compromise (IoCs) are digital and informational 'clues' that incident responders use to detect, diagnose, halt, and remediate malicious activities in a network.

Figure 3:
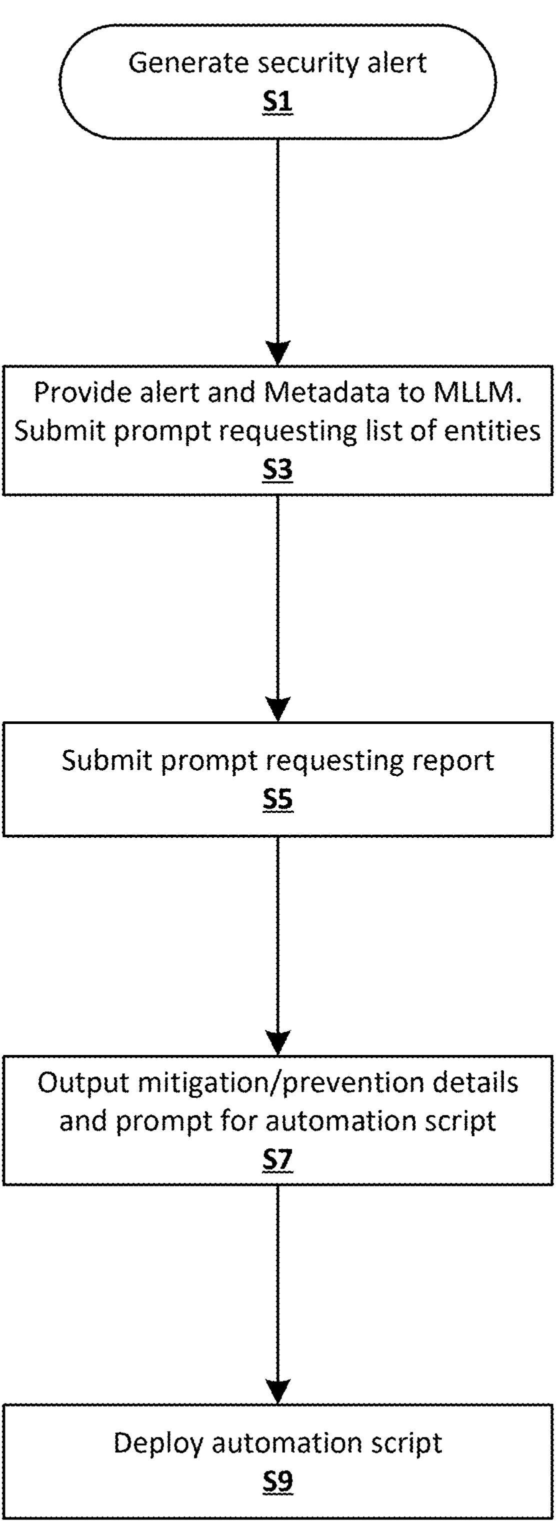
FIG. 3 shows a flowchart for an example prompt engineering strategy for guiding a generative ML model to synthesize computer-readable code that is executable to automatically implement a cybersecurity mitigation action.

Reference is made to FIG. 3, which is a flowchart that represents a security investigation process using techniques described herein. In the example of FIG. 3, plural prompts are submitted consecutively in a chat session with the model. The model may provide a reply to each prompt.

At a first step S1, a security alert is generated. As explained above, an alert is a positive detection of a security threat by a cyber security detector. Generating an alert may cause a suitable computer tool, such as a reporting tool of the cybersecurity detector to generate a security incident graph that provides a visual representation of the alert and entities involved. In some examples, text content may also be generated, the text content describing details of the alert and the entities involved. That is, image and text content that represents a security threat, and which may be analysed to understand the security threat for mitigation and prevention purposes, may be generated automatically by a computer device implementing a security tool that generates the image and text (fusion) content.

Steps S3 and S5 are concerned with submitting prompts to an MGM. Each of steps S3 and S5 may represent a separate prompt to the MGM, e.g., provided sequentially in a chat session with the MGM.

At step S3, an MGM is provided with a security incident prompt comprising the alert, and its metadata in the form of a text and security incident graph, data as generated at step S1. The MGM is prompted to generate a list of entities that captures the identity(ies) of the attackers. That is, the prompt may comprise an extraction instruction requesting generation of the list of entities.

At a next step S5, a second prompt to the MGM is submitted, the second prompt comprising a mitigation instruction requesting that the MGM generate a report that includes text and images. The MGM may learn to generate a report by following few-shot examples that are provided or 'attached' as part of an input prompt. A desired style and structure of a report may be defined in the input prompt. The report may detail an activity that caused the alert. To detail an activity, the second prompt in step S5 may contain metadata from the security incident prompt of step S3. The metadata may contain activity information, and the generated report includes this information. The activity may be a threat actor activity which is performed in line with a methodology that the model is trained to identify based on training fusion content. That is, model parameters may be trained such that the model can process details of an attacker action and map that action to one of a plurality of abstract methodologies that the model is trained to identify, based on its understanding of training fusion content. The prompt in step S5 may request, in the mitigation instruction, that the report detail what happened, how it happened, and provide details of mitigation and/or prevention strategies. The output report, provided in response to step S5, may comprise diagrams that detail the architectural flaws of the system, where attackers gain access. In some examples, the MGM is not trained to generate these diagrams. Instead, models such as DALL-E may be leveraged to generate the diagrams. In other examples, public benchmark datasets may be used to finetune the image generation model.

At a step S7, details of mitigation and prevention strategies output in response to step S5 may be used to prompt the MGM a third time in the chat session. The third prompt may comprise a code generation instruction instructing the MGM to generate an automation script for the system. The automation script may, when implemented, may improve security of the system, for example by mitigating or preventing attacks of the form that initially caused an alert to be raised at step S1.

At a step S9, the automation script is deployed to implement an improvement to the system for mitigation and prevention. An automation script may be run to implement actions such as advanced hunting, quarantining, and blocking. A decision to run an automation script may be may by a security analyst. Other mitigation actions that might be taken based on an output of the MGM include threat analysis, advance threat hunting, threat mitigation, dashboarding, threat blocking, threat isolation, device quarantine, and user education. Removing or restricting access of a device or other entity to a system, service, or network is an example of quarantining.

An output report, generated based on the prompts of steps S3 and S5, may be characteristic of security reports that the model has seen, either as part of training content, fine-tuning content as described later, or in one-shot or few-shot examples which may optionally form part of the prompt.

The use of an MGM to improve performance of downstream inference tasks in the security domain is advantageous in several ways. Much user time is saved by enabling input of image data to represent security threats, alerts, and details thereof, as opposed to inputting text that accurately describes what such an image may represent. Furthermore, the inventors have noted an improved performance of the system when using multi-modal models in a security context. That is, techniques described herein may effectively and efficiently mitigate and prevent security threats in computer services.

For instance, the inventors have noted that examples described herein provide improved accuracy, as the MGM can consider more input data (text, images, source code etc.) without losing any available information or context. The model has more details to provide a more accurate output. Further, the present examples avoid human bias and enable faster threat hunting. While humans perform the processes described herein by trying to include information from multiple sources, this either requires a lot of time (allowing more penetration of the security threat), or could involve human bias. That is, humans may make quick decisions based on few data sources, instead of all data sources.

Examples below may utilize the GPT4 (generative Pre-Trained Transformer 4) model, an exemplary multi-modal large language model. It will be appreciated, however, that other MGMs, such as BLOOM, LLAMAv2, KOSMOS-2 etc. may be used.

Training and finetuning of an MGM for use in a security context, such as for implementing techniques in accordance with FIG. 1, is now described with reference to FIGS. 2*a*-2*c*.

FIG. 2*a* shows a highly schematic block diagram illustrating a fine-tuning process at an MGM. It will be appreciated that whilst FIGS. 2*a*-2*c* represent training of a multimodal LLM, provision of text data is optional and in some examples the model will operate only on image data such as security incident graphs to extract predicted IoCs or generate indications of a cybersecurity mitigation action.

In the example of FIG. 2*a*, text content 22*a* and a security incident graph 22*b* are input to an MGM 20. The text 22*a* and incident graph 22*b* may be provided as part of a training prompt, alongside a prediction instruction pertaining to the graph 22*b* and text 22*a*. The prediction instruction may request that the model predict an IoC associated with the input. The MGM 20 may be configured to output an indication of one or more predicted IoC 21 that is present in the text 22*a* and incident security graph 22*b*. The text 22*a* and security incident graph 22*b* are part of a training or fine-tuning data set, and may be associated or labelled with one or more ground truth IoC 23 that is present in the text 22*a* and incident graph 22*b*. To generate the predicted IoC. A difference between the output IoC 21 calculated by the MGM 20 and the ground truth IoC 23 are calculated via a loss function 25. Finetuning may be implemented by adjusting parameters of the MGM 20 such that a derivative of the loss function is minimised. The principles of fine tuning an MGM using a loss function are described in more detail later herein.

Figure 2B:
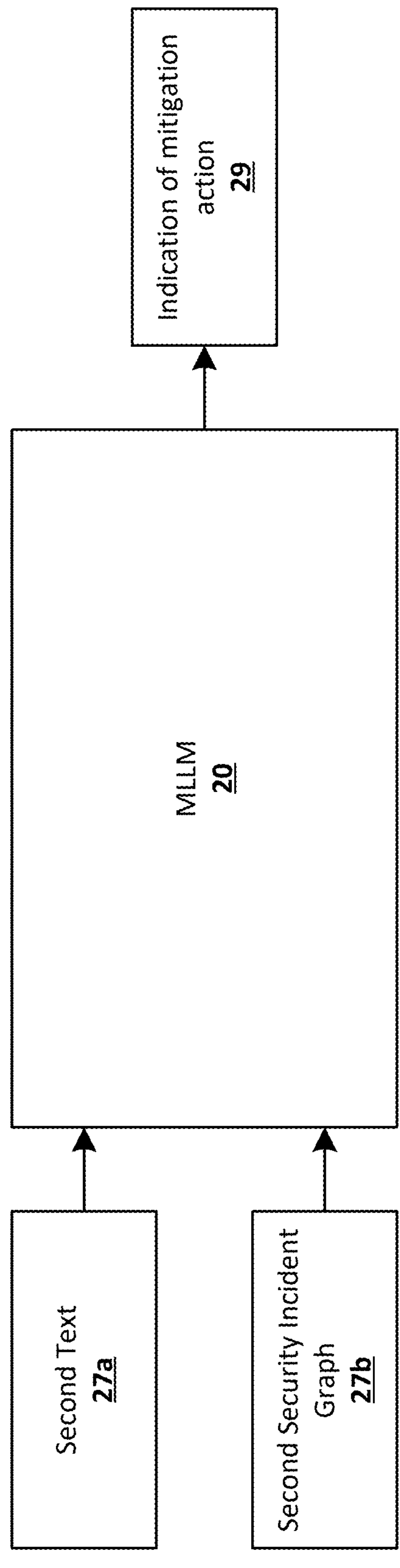

FIG. 2*b* shows a runtime example in the MGM system of FIG. 2*a*. There is no ground truth comparison with the MGM output via a loss function in the runtime example of FIG. 2*b*. In FIG. 2*b*, a second security incident graph 27*b* and second text 27*a* are input to the MGM 20. The second text 27*a* and second incident graph 27*b* may be provided as part of a mitigation prompt, the mitigation prompt comprising a mitigation instruction pertaining to the second graph 27*b* and second text 27*a*. The mitigation instruction may request that the model provide an indication of a cybersecurity mitigation action based on the mitigation prompt. Examples of a cybersecurity mitigation action may include blocking a compromised device in a system.

The image and text in FIG. 2*b* are referred to as 'second' image and text so as to differentiate from the text and images of the training prompt in FIG. 2*a*. An indication of a cyber security mitigation action 29 is output based on the at least one mitigation prompt. In this runtime example, the model 20 may be a generative model that generates a cybersecurity report comprising the indication of a cyber security mitigation action 29. The report may comprise multimodal content including text and images.

FIG. 2*c* shows a highly schematic block diagram that represents a training pipeline 200 of an MGM system according to some examples. FIG. 2*c* shows a finer-grain illustration of components such as encoders and decoders than is shown in the example of FIG. 2*a*. It will be appreciated that training and finetuning may continue when the system is implemented in practice.

In some examples, multiple models may be used, each pre-trained on a public dataset. However, the multiple models may be fine-tuned end-to-end—i.e., each part of the pipeline is fine-tuned simultaneously as opposed to sequentially. The fine-tuning of parameters may be based on calculation of a loss function, as described in more detail later.

In some examples a text pipeline, comprising blocks 210, 211, 213, 215, 219, 217, 233, and 231 may be performed before an image pipeline comprising blocks 220, 221, 223, 229, 225, 227, and 231. These blocks are described in more detail below. In other examples, the text and image pipelines above may be performed in parallel. A 'Huggingface' language model may be leveraged for the above text pipelines. In other examples, a Turing universal language representation model may be used.

The pipeline 200 may be understood to include all blocks of FIG. 2*c*. Finetuning may be conducted using a labelled dataset that provides a ground truth. For example, each of the early layers in the pipeline of FIG. 2*c*, such as the text encoder, image encoder, and fusion encoders, may be pre-trained on public data sets and fine-tuned using loss function calculations between an output of the model and a corresponding ground truth item. A fine-tuning training set, comprising the above ground truth items, may be constructed by a manual labelling exercise. Fine-tuning will be understood as a process in which parameter weights of a model that is already trained on a first set of training data are further trained on new data, typically but not exclusively a smaller, more application-specific set of new data. Fine tuning may be performed on a subset of layers in a neural network, or on the entire network. Models may be pre-trained on a large general corpus of training data and parameters may be subsequently fine-tuned by conducting further training on task-specific training data. The aim of a fine-tuning process may be to minimise the gradient of a loss function, wherein the loss function evaluates a numerical difference between vector outputs calculated by the model, and a corresponding ground truth vector.

In effect, the pipeline 200 is configured to extract indicators of compromise (IoCs) from fusion content (e.g., content 201 as described below). By ingesting image and text representations from the fusion content 201, and leveraging historical ground truth IoC data, IoCs in runtime input data (e.g., input fusion documents) may be output.

Block 201 represents security blogs, reports, articles or other fusion content comprising image content and text content.

The image and text data may take the form of unstructured text data 210 and unstructured image data 220 extracted from the fusion content 201, which is interpretable by a computer system hosting the MGM. Known techniques may be used to extract the unstructured data 210 and image data 220. Images may be embedded without text extraction applied to the images. However, it is also feasible to embed the image with an additional text extraction step.

Text pre-processing 211 may be conducted to prepare the unstructured text for processing in later stages. Text pre-processing 211 may include steps such as removal of punctuation, lower casing, tokenization or segmenting of the text into chunks etc. Other known preprocessing steps 211 may be implemented.

The unstructured text 210 may undergo pre-processing 211 to segment the text into chunks, wherein each chunk may later be encoded as a vector. Fusion documents as a whole may be too long to embed in a single vector, and learning to embed documents is challenging because a single document of fusion content may contain multiple distinct IoCs recognizable to the system. This challenge is addressed by generating text embeddings and image embeddings separately for text and images in a fusion document, and later fusing the vectors, as described below.

Unstructured text 210 may be preprocessed to form n text chunks 213, wherein each chunk 213 may represent a paragraph, a sentence, a subsection, etc. FIG. 2*c* shows a first text chunk 213*a* and an nth text chunk 213*b*. It will be appreciated that the unstructured text 210 may be segmented into any number of chunks.

Text chunks are passed to a text encoder 215 which generates an embedding 219 for each text chunk 213. The embeddings 219 may be shared embeddings which occupy a same vector space as embeddings 229, which are generated to represent image data as described later herein.

Embeddings 219 corresponding to each text chunk 213 may then be combined into a larger embedding by a fusion encoder 217. Notably, the larger embedding is generated after the text encoder 215 has generated chunk-wise embeddings for each text chunk 213. The fusion encoder may generate the larger embedding by techniques such as concatenation or summation etc.

The fusion encoder 217 may be a single layer model that retains a conceptual understanding of the larger embedding. The fusion encoder may form part of an end-to-end training pipeline in which each part is trained simultaneously rather than sequentially.

The fusion encoder may be trained on outputs of a loss function 237 (described later), and/or on IoC labels in an end-to-end case. Loss function outputs may be back propagated through all encoders for fine-tuning purposes.

In addition to unstructured text 210, unstructured image data 220 is also extracted from fusion content 201. The unstructured images may comprise a plurality of images, graphs, drawings and/or diagrams extracted from the fusion content 201.

Image pre-processing 221 is performed on the unstructured images 220. Pre-processing 221 may comprise operations such as reorientation, re-sizing, grey scaling, adjustments to brightness or exposure, mirror image operations etc.

Pre-processed images 223 are output. FIG. 2*c* shows a first image 223*a* and an nth image 223*b*. It will be appreciated that any number of images may be extracted from the fusion content 201 as unstructured images, and passed separately for pre-processing 221.

Each distinct pre-processed image 223 is passed to an image encoder 225 and a respective vector embedding 229 for each image is generated. As described above, the embeddings 219, 229 may be shared embeddings. That is, the embeddings 229 may be embedded in a same vector space as the text embeddings 219.

After each image has been embedded separately, a fusion encoder 227 generates a combined vector representation of the image data extracted from the fusion content 201. Fusing respective vectors generated for each image helps to retain the context of the images.

At this point, there is no mapping between images and text. Such a mapping is introduced by block 231, which represents a multi-modal encoder. Multi-modal encoder 231 is a layer in which the text and image vectors output by the fusion encoder 217, 227 are encoded as a single feature vector. Encoder 231 may perform a concatenation or accumulation operation, or use a neural network model to form an output vector fusing image and text embeddings.

It will be appreciated that the multi-modal encoder may not be a trainable component as such. Combining the image and text embeddings at block 231 may comprise a programmatic combination of the image and text feature vectors.

In some examples, one of text content and image content from the fusion content 201 may be more relevant than the other for the purpose of assessing security risks to a system or service. To account for this, a cross-modality attention mechanism 233 may be implemented. That is, in some cases the extracted text may include more important information for determining IoCs than the images, and vice versa in other examples. The attention mechanism may account for any imbalance of importance between image content and text content, ensuring that weightings in the output vector of the multi-modal encoder 231 reflect the relative importance of each constituent embedding (text and image), which reflect the text and images initially extracted from fusion content. That is, some additional weighting may be applied by the multi-modal encoder 231 such that either the text-based or image-based vector is prioritized by weighting when fusing these embeddings at the multi-modal encoder 231.

By way of example, the relative importance (cross-attention) of an input vector $x_j$ to an input vector $z_i$ from a different set of input vectors may be found using a decoder step. The different set of input vectors in this case may refer to vectors derived from input data of different modalities, e.g., images/text. Generally, a neural attention function is applied to a query vector q and a set of key-value pairs. Each key-value pair is formed of a key vector $k_i$ and a value vector $v_i$, and the set of key-value pairs is denoted $\{k_i, v_i\}$. An attention score for the $i^{th}$ key-value pair with respect to the query vector q is computed as a softmax of a dot product of the query vector with the $i^{th}$ key value, $q \cdot k_i$. It will be known to the skilled person that softmax is an activation function that scales number values in a vector into relative probabilities, which all sum to 1. An output is computed as a weighted sum of the value vectors, $\{v_i\}$, weighted by the attention scores.

To calculate cross-attention scores Bi, of input vectors $x_j$ to input vectors $z_i$ in a different set of input vectors, a self-attention score $a_{i,j}$ indicating relative importance of vectors within a one of the sets of input vectors may first calculated. That is, a first input sequence of vectors may be an input to the transformer (e.g., text features or image features) or a 'hidden' input from another layer in the transformer. For each input vector $x_j$ in the first input sequence, a query vector $q_j$, a key vector $k_j$ and a value vector $v_j$ are computed through matrix multiplication of the input vector $x_j$ with learnable matrices $W^Q$, $W^V$, $W^K$. An attention score $\alpha_{i,j}$ for every input vector $x_i$ with respect to position j (including i=j) is given by the softmax of $$q_j \cdot k_i^T,$$

(where $$k_i^T$$

is the transpose of $k_i$). An output vector $y_j$ for token j is computed as a weighted sum of the values $v_1, v_2, \ldots,$ weighted by their attention scores: $y_j = \Sigma_i \alpha_{i,j} v_i$. As explained above, the attention score $\alpha_{i,j}$ captures the relevance (or relative importance) of input vector $x_j$ to input vector $x_i$.

As discussed, cross-attention is used in one embodiment to combine text and image features (or multi-modal features more generally). Cross-attention between a first set of input vectors and a second set of input vectors may be performed as follows. For each input vector $x_j$ in a first input sequence (e.g., derived from content of a first modality, such as one of text or image), a query vector $q_j$, a key vector $k_j$ and a value vector $v_j$ are computed through matrix multiplication of the input vector $x_j$ with learnable matrices $W^Q$, $W^V$, $W^K$. The output attention matrix $y_j=\Sigma_i a_{i,j} v_i$ from the encoder step may be multiplied with a learnable matrix $$W_d^Q$$

of the decoder step to obtain a query vector $$q_j^d.$$

The learnable matrices $$W_d^Q$$

may form part of the LLM parameter weights, and may be learned in the same way as other model parameters during training; i.e., using gradient descent. Input vector $z_i$ (from the second set of vectors of a different modality, such as the other of text or image) is multiplied with learnable matrices $$W_d^V$$

and $$W_d^K$$

of the decoder step to obtain the key vector $$k_i^d$$

and the value vector $$v_i^d.$$

Cross-attention scores $\beta_{i,j}$ are computed by the softmax of the dot product of the query vector $$q_j^d$$

and the transpose of the key vector $$k_i^d.$$

An output vector $p_j$ for token j is computed as a weighted sum of the values $$v_1^d, v_2^d, \ldots ,$$

weighted by their attention scores:

$$p_j = \sum_i \beta_{i,j} v_j^d.$$

The attention score $\beta_{i,j}$ captures the relevance (or relative importance) of input vector $x_j$ to input vector $z_i$. Cross-attention may be combined with self-attention, e.g. with self-attention over one or both sequences prior to cross-attention.

It will be appreciated that other techniques for determining relative importance of embeddings derived from the two modalities (text/image) may be implemented.

A decoder 235 receives a multimodal vector embedding as input, the multimodal vector embedding being output by the multi-modal encoder 231. The decoder 235 may comprise a generator model, or may comprise a traditional classifier decoder model. An IoC output 237 of the decoder 235 may comprise an indication of one or more IoC identified in the fusion content 201.

In examples where a traditional decoder model, e.g., a classifier is implemented, the IoC output 237 may comprise a multi-dimensional matrix, each dimension therein representing a known IoC, based on training data such as labelled security reports etc. Values held in the matrix of the IoC output 237 may indicate a probability that each IoC is present in the input fusion content 201. The probability may be an absolute probability of each IoC, in the range of (0, 1). That is, there may be multiple IoCs identified in a given report, so each IoC has an absolute probability. Every IoC having a probability above a particular threshold is considered. The threshold may be decided experimentally.

In examples where a generative decoder model is implemented, the IoC output 237 may comprise a natural language output that specifies one or more particular IoC that has been identified in the test fusion content. That is, the IoC output 237 may provide a natural language interpretation of the output matrix that may be generated by a classical decoder. In other examples where a generative decoder is implemented, a multi-modal IoC output may be generated, the multi-modal IoC output including both natural language text and images/graphs/figures etc. to indicate and explain which IoCs are determined to be present in the input fusion content 201.

In the generative decoder example, using a prompt-based input structure, additional few-shot examples 240 may be input to the decoder in addition to the output vector of the multi-modal encoder 235. The few-shot examples may comprise one or more paired example of fusion content and ground truth output in the form of a report.

It will be appreciated that the use of single-shot or few-shot examples 240 to augment the decoding process is optional. That is, a prompt to the model may be a zero-shot prompt that relies on a trained knowledge of security reports in the model. Where single-shot or few-shot examples are not provided in a prompt, the model may understand the content and structure of a security report from ingesting training fusion content or other generic training data. Alternatively or additionally, the model may learn how to construct a security report based on a fine-tuning process in which loss calculations are performed against ground-truth security reports.

Ground truth data 250, including ground truth IoCs and respective recommendations, may be leveraged to improve the ability of the model to generate a user-readable report that identifies one or more IoC present in the fusion content 201, and recommendations for addressing those IoCs (i.e., an indication of a cybersecurity mitigation action). The ground truth data 250 may be based on historical fusion content, and may comprise IoCs derived from historic fusion content, and respective solutions that are known in the present context of computer service security.

As mentioned above, a loss function 239 may be implemented to quantify a difference between ground truth data 250 and an IoC output 237 of the pipeline 200, i.e., the set of one or IoC identified in the fusion content 201 by the MGM. Model parameters, or parameters in particular layers therein, may be fine-tuned by adjustment of those parameters such that a gradient of the loss function is minimized.

Inputs of the loss function therefore include IoC output 237 and the ground truth data 250. The loss function 239 may be supplemented by in-put of additional security components 280, which may be generated based on application of uni-modal predictor models to the unstructured text and image data 210, 220.

A uni-modal text-based predictor 260 may receive input of unstructured text data 210, the unstructured text extracted from the fusion content 201. The uni-modal text-based predictor 260 may comprise an existing text classifier model which is known to function well, but which is only capable of processing textual content. An aim is to incorporate this existing learned knowledge into the multi-modal training. Whilst a known pretrained text-only model is used, the process in which the model is used is novel. Further, blocks 213 and 217 of FIG. 2*c* represent new techniques in the context of security reports. Breaking text into multiple chunks to make sure that context is learned in detail whilst not losing any input information is novel in a security context.

The text-based predictor 260 receives inputs, and may provide outputs that are input to the loss function to assess the ability of the pipeline 200 to determine IoCs relative to the ground truth, and optionally in view of additional uni-modal predictor output data from the text-based predictor 260.

The loss function may include a first term which penalizes error in IoC output 237 with respect to the ground truth data 250. The loss function may further include a second term which penalizes error in IoC output 237 with respect to the uni-modal prediction. Common loss functions such as cross entropy loss or hinge loss may be used.

Outputs of the loss function, which quantify a difference between the IoC outputs 237 and the ground truth 250, may be back propagated through the pipeline to finetune models therein. Reference 290 denotes a line that represents back propagation of the loss function 239 output through the multi-modal encoder 231. It will be appreciated that this back propagation may be implemented at all encoder blocks 215, 217, 225, 227, 231.

Figure 4:
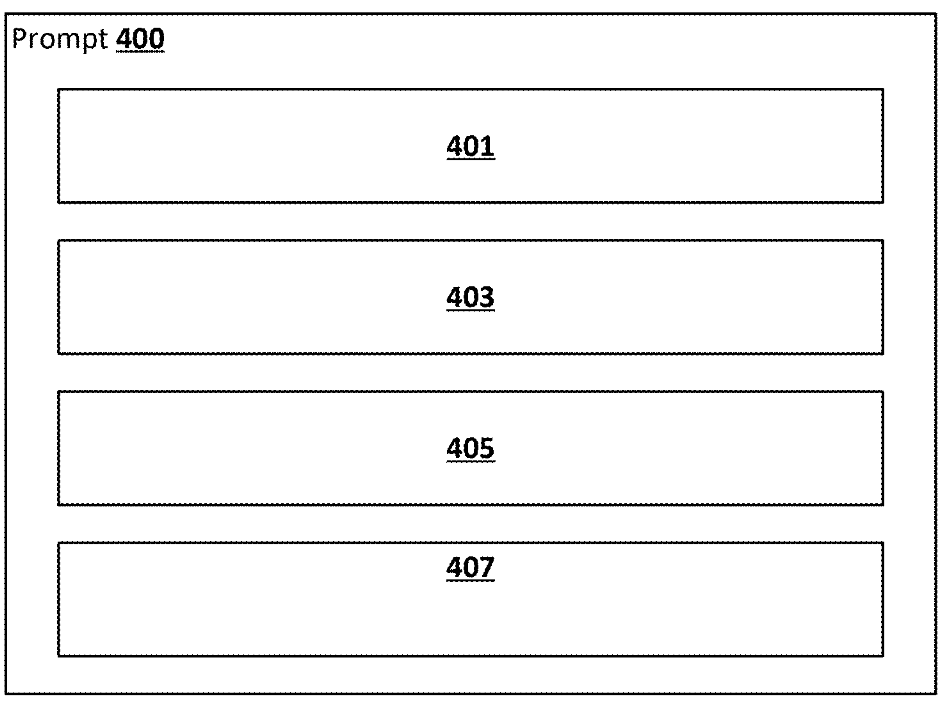
FIG. 4 shows an example components of a prompt or prompts used to guide generative ML model.

In some examples, the techniques described herein may be implemented by a prompt-based model that receives a multi-modal prompt comprising natural language text and image data to prompt a response from the MGM. Reference is made to FIG. 4, which illustrates an exemplary structure of a multimodal runtime prompt, which may be input to the model to identify IoCs present in related fusion content.

FIG. 4 shows an exemplary multimodal input prompt 400. It will be appreciated that the format, structure and content of the exemplary prompt 400 is given by way of example only. Other viable ways of laying out such a multi-modal prompt exist, and the precise language used in a prompt is not limiting.

The exemplary prompt 400 is laid out under a plurality of blocks 401-407. Each block may provide a different part of the prompt, and may comprise one or more of natural language content and image content. Text content falling under a particular block may refer back (or forward) to content under a different heading, e.g., by citing a name of the different block. Any number of blocks may be provided in a prompt, Though the example of FIG. 4 shows four blocks 401, 403, 405, 407.

Figure 4A:
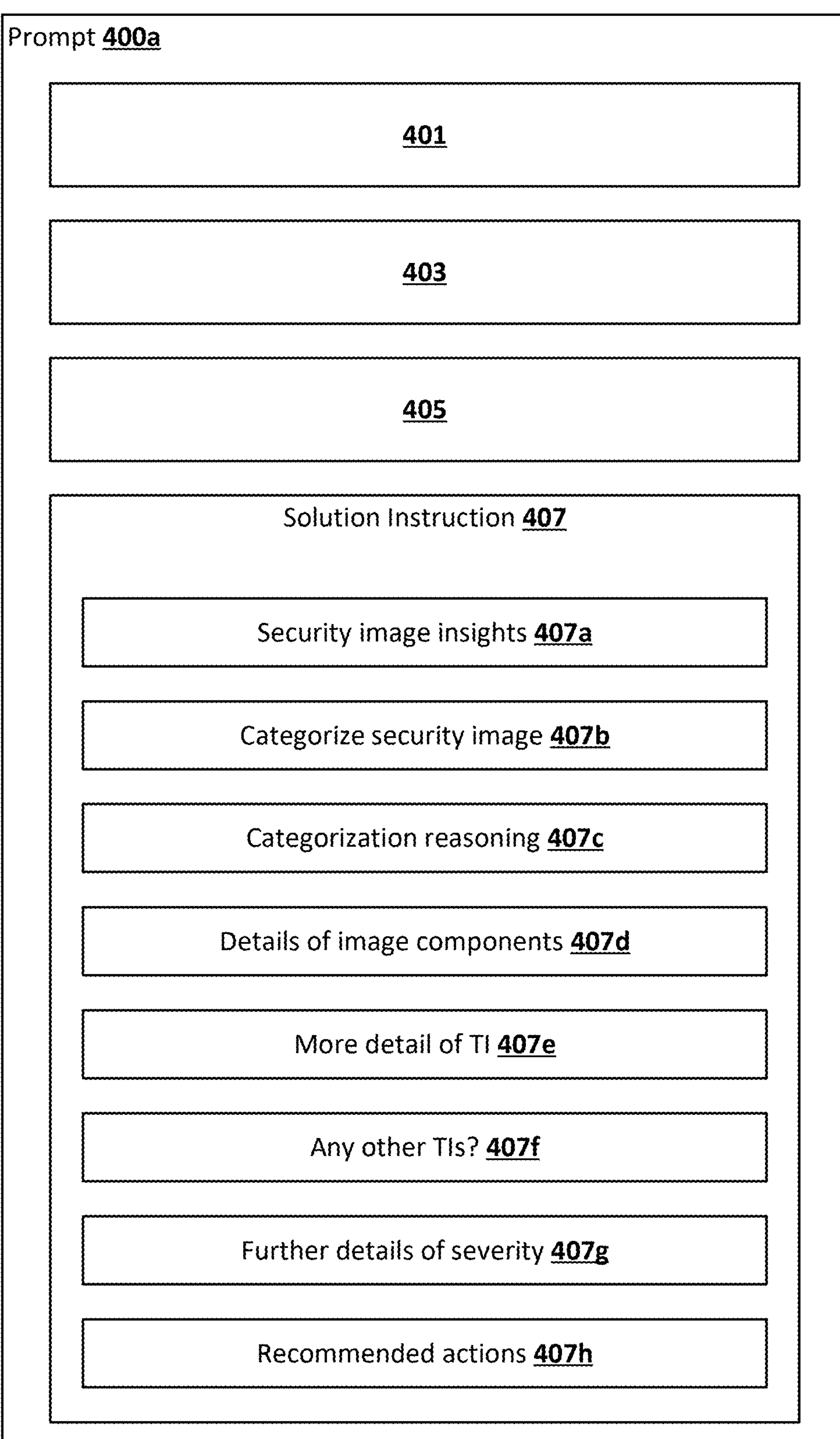
FIG. 4*a* shows a block diagram representing a first example prompt.

In a first example, a prompt 400*a* may be constructed as follows, and as illustrated in FIG. 4*a*. Under a first block 401, text content may be provided which describes a security problem.

In the first example, a second block 403 may provide a description of a security image. Text content falling under the second block 403 may provide a natural language description of an image provided later in the multi-modal prompt 400.

In the first example, a third block 405 indicates a security image. That is, image content may be provided in the third block 405, the image content providing a graphical representation of a computer service or system in which IoCs (or TIs) may be identified.

In the first example, a fourth block 407 may indicate a solution instruction. Solution instruction text content provided under the fourth block 407 may provide a desired format in which an output of the model should be provided. Exemplary text under the fourth block 407 of FIG. 4 may make a number of requests for information and/or an answer to a question. FIG. 4 shows eight exemplary requests 407*a*-407*h*. That is, there are eight sub-items (also referred to as output elements) under the solution instruction block 407, and each item asks a question or requests some expansion on a conclusion/inference made by the model.

In the example of FIG. 4*a*, a first output element 407*a* instructs the model to generate one or more security insights on the image provided in the image of block 405. One example of a security insight generated by the MGM might be an indication of a compromised entity represented in a security incident graph. A second output element 407*b* requests that the model categorize the image of block 405. In the second output element, a number of suggested categories may be provided, e.g.: 'attack chain diagram', 'bar/line plot', 'maps', 'source code used by threat actors', 'incident graph', 'images/texts used by threat groups'. These example categories are provided as an 'open set', meaning that the model is free to assign a category to the image that does not appear in the list, based on its own semantic interpretation of the image using the wider context of the prompt 400. A third output element 407*c* may instruct the model to provide reasoning for its chosen categorization of the image. A fourth output element 407*d* may request details of the components of the image provided in block 405. A fifth output element 407*e* may request more detail of an IoC that is identified in the image of block 405. A sixth output element 407*f* may instruct the model to state if any other TIs have been identified. A seventh output element 407*g* may request details of the severity of an identified threat. An eighth output element 407*h* may instruct the model to provide a set of one or more recommended action to mitigate the threat and/or prevent future occurrences of the same threat.

Prompt #1 is an example of a prompt of the type shown in FIG. 4*a*. Prompt #1 is provided below:

Prompt #1

Extracting Insights from Different Kind of Security Reports and TI Documents

Problem Description.

During their involvement in active research and hunting tasks, the intelligence analysts will gather hastily written materials called 'fusion content' to document their discoveries.

Fusion content includes for examples detailed description of threat actors or activity profiles. The objective is then to assemble this fusion content to produce a final report called "finished content" (e.g. "Threat Analytics", "Actor Profile" and "Blog posts").

Generating these reports is laborious and time consuming.

Security Images and graphics/charts of all stripes represent an important part of "fusion content" used by analysts to write the final reports.

These graphics include, but are not limited to: attack chain diagrams, bar/line plots, maps, source code and sometimes screenshots of images/texts used by threat groups.

The goal is to speed up the process of writing and support the intelligence analysts in generating TI reports quickly.

This can be achieved by generating descriptions of images/graphics related to different Tis.

The description of the security image is provided in the section "### Security Image Description" and the image is provided in the section "### Security Image". The required solution output format is provided in the section "### Solution Instruction"

Security Image Description

Security Image

Solution Instruction

Your solution should be in the following format.

(1) Provide some insights on the security image.

(2) What category of security graphic is it?

Attack chain diagrams bar/line plots

Maps.

Source code used by the threat actors

Incident graph images/texts used by threat groups . . . etc (3) Why do you think it belongs to the specific category?

(4) Describe with details the different components of the image (5) Can you provide more details on the TI described in this image?

(6) Do you know any other TI that can be related to this one?

(7) Is there anything else that you can tell me in terms of the severity of the incident?

(8) As a cyber security specialist, what actions should I take against this incident?

It will be understood that underneath the '### Security Image Description' header, a security image may be provided, and underneath the '### Security Image' header, generated text related to the security image may be provided.

Figure 4B:
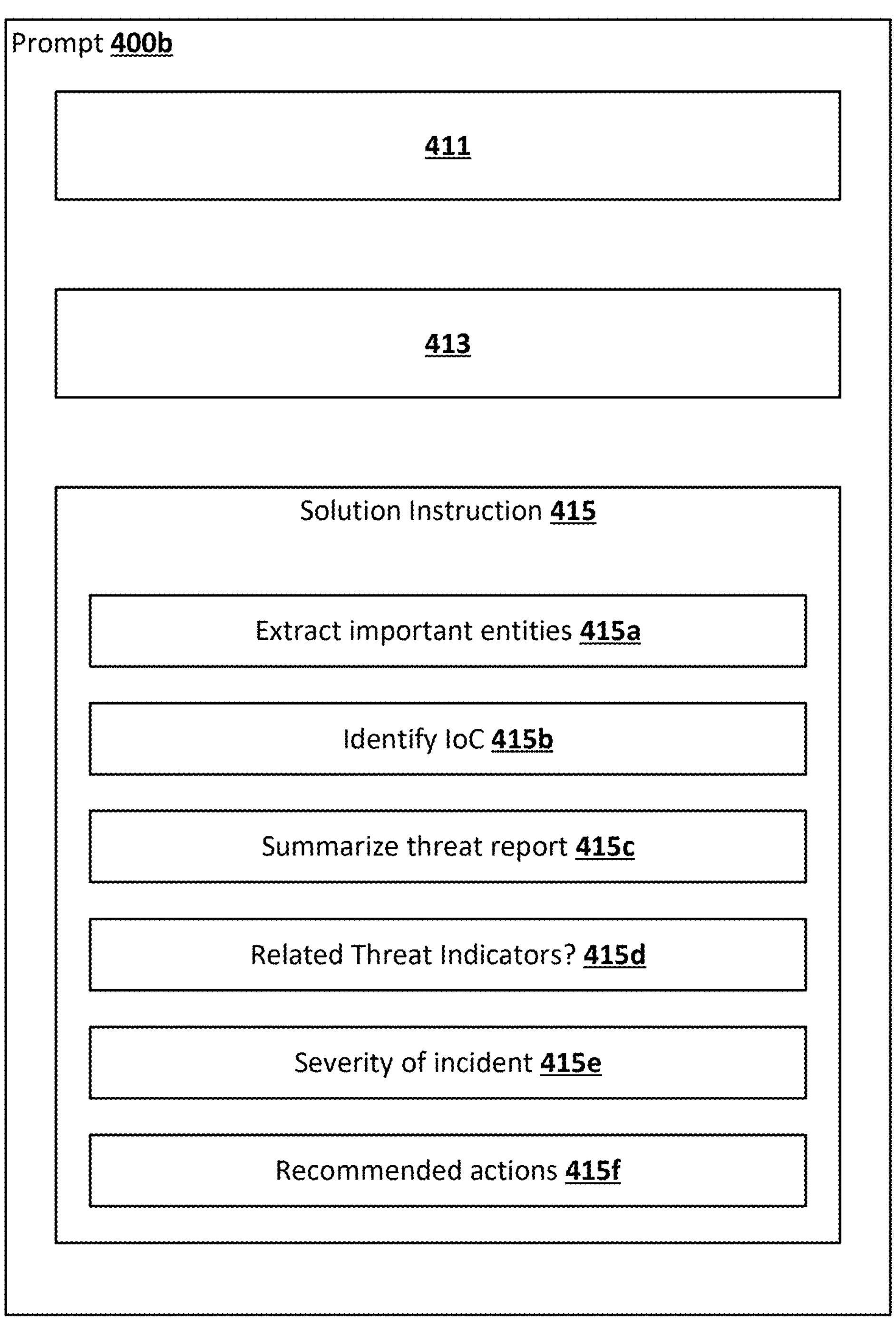
FIG. 4*b* shows a block diagram representing a second example prompt.

FIG. 4*b* represents a second example of an input prompt 400*b*. FIG. 4*b* represents an example mitigation prompt 400*b* comprising an extraction instruction that instructs the ML generator to extract a compromised entity based on text associated with the cybersecurity threat.

In the second example, a first block 411 represents a problem description, which may be provided in the prompt as text.

A second block 413 represents text content, for example text content associated with a cybersecurity threat. The text content may be generated by security tools, as described previously herein.

A third block 415 provides a solution instruction. The solution instruction 415 comprises a plurality of output elements 415*a*-415*f*, which each make a request of the MGM. The output elements 415 include instructions for the MGM to extract important entities 415*a*, identify indicator(s) of compromise in the text 415*b*, summarize the text (e.g., the cybersecurity threat report text) 415*c*, identify other related threat indicators 415*d*, comment on a severity of the threat or incident 415*e*, and to recommend actions 415*f*.

Prompt #2 is an example of a prompt of the type shown in FIG. 4*b*. Prompt #2 is provided below:

Prompt #2

Extracting Insights from Different Kind of Security Reports and TI Documents.

Problem Description.

During their involvement in active research and hunting tasks, the intelligence analysts will gather hastily written materials called 'fusion content' to document their discoveries.

Fusion content includes for examples detailed description of threat actors or activity profiles. The objective is then to assemble this fusion content to produce a final report called "finished content" (e.g. "Threat Analytics", "Actor Profile" and "Blog posts").

Generating these reports is laborious and time consuming.

Security Images and graphics/charts of all stripes represent an important part of "fusion content" used by analysts to write the final reports.

These graphics include, but are not limited to: attack chain diagrams, bar/line plots, maps, source code and sometimes screenshots of images/texts used by threat groups.

The goal is to speed up the process of writing and support the intelligence analysts in generating TI reports quickly.

This can be achieved by generating descriptions of images/graphics related to different TIs.

The entire threat report textual content is provided in the "### Text Content" section. The required solution output format is provided in the section "### Solution Instruction".

Text Content

Solution Instruction

Your solution should be in the following format.

(1) Extract important entities and key-phrases from the text content.

(2) Identify the Indicators of Compromise (IoC) from the entire text report and tabulate them.

(3) Summarize the entire threat report in strictly less than 100 words.

(4) Do you know any other TI that can be related to this one?

(5) Is there anything else that you can tell me in terms of the severity of the incident?

(6) As a cyber security specialist, what actions should I take against this incident?

It will be understood that underneath the '### Text Content' header above, generated text fusion content may be provided.

Figure 4C:
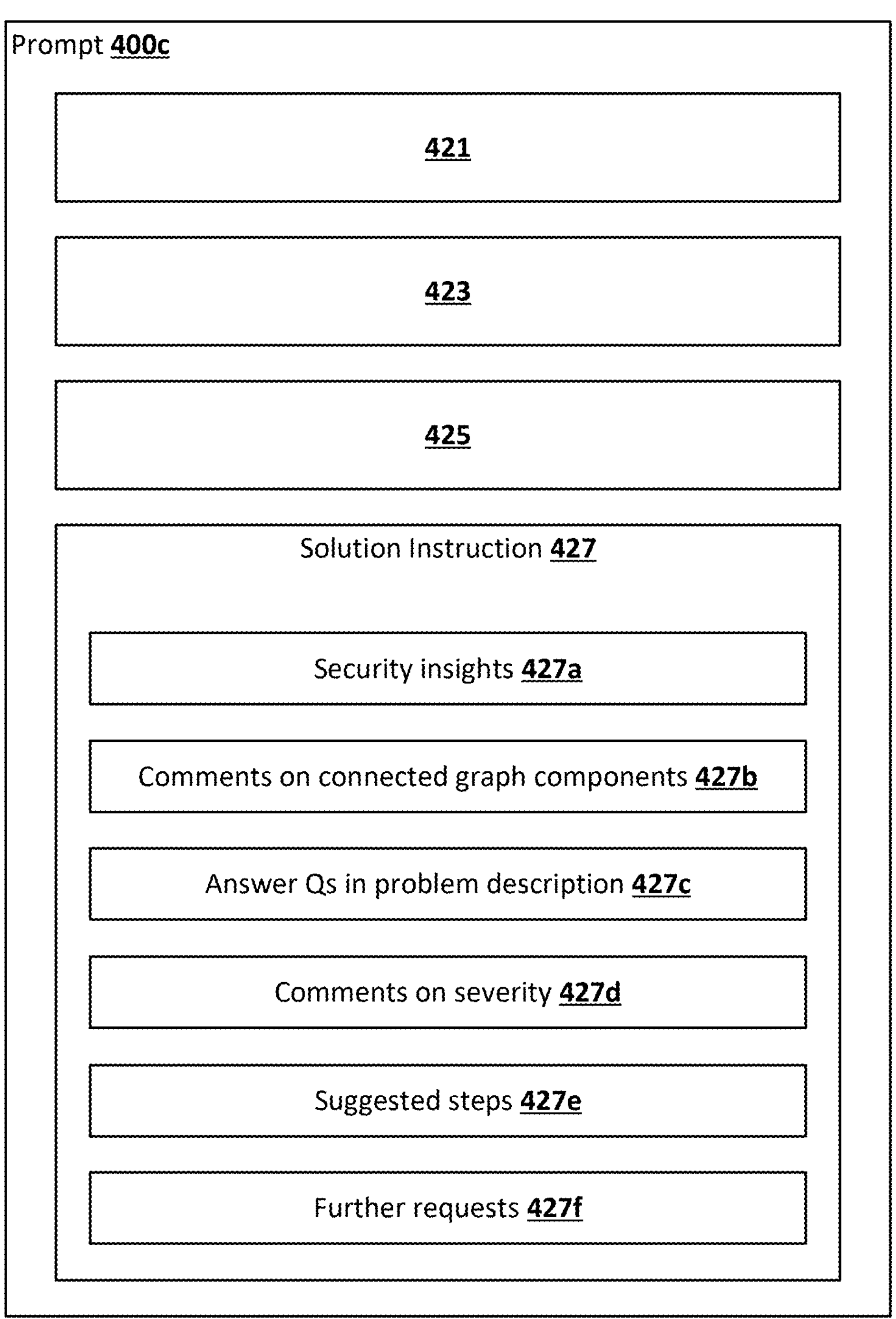
FIG. 4*c* shows a block diagram representing a third example prompt.

FIG. 4*c* shows a third example 400*c* of a mitigation prompt. The third example comprises a first block 421 representing a problem description. A second block 423 comprises a security incident description, which may be text fusion content generated by a security tool which provides a description of an incident graph. An incident graph is provided in a third block 425. A fourth block 427 provides a solution instruction comprising a plurality of output elements 427*a*-427*f*.

The respective output elements request that the MGM provide insight on the security incident 427*a*, a discussion of what the connected components of the graph say about the security threat or incident 527*b*, an answer to a question in the problem description (421) 427*c*, comments on the severity of the security threat 427*d*, and suggested mitigation actions 427*e*. Output element 427*f* may request that the response to elements 427*a-e* be of a particular style or nature, e.g., objective, factual, and unbiased.

Prompt #3 is an example of the type of prompt shown in FIG. 4*c*. Prompt #3 is provided below:

Prompt #3

Extracting Insights from Security Incident Graphs

Problem Description

You are a cybersecurity analyst who is looking at a security incident graph that is connecting an alert to its associated entities. You need to provide security-specific insights about the graph in terms of the nodes and edges. You can use the following questions on inferring graphs to guide your response:

(1) What are the patterns of connectivity between nodes?

(2) Are there clusters of nodes that are more densely connected than others?

(3) Are there any hubs (highly connected nodes)?

(4) What do the clusters of nodes represent?

(5) What do the hubs represent?

For example, in a social network graph, clusters of nodes may represent groups of friends or communities of people with shared interests, while hubs may represent influential people or organizations. In a transportation network graph, clusters of nodes may represent cities or regions with high levels of connectivity, while hubs may represent major transportation hubs such as airports or train stations.

The description of the security incident is provided in the section "### Security Incident Description" and the image of the security incident graph is provided in the section "### Security Incident Graph Image". The required solution output format is provided in the section "### Solution Instruction"

Security Incident Description

Security Incident Graph Image

Solution Instruction

Your solution should be in the following format.

(1) Provide some insights on the security incident.

(2) What does the connected component in the graph between alert-entity say about the security incident?

(3) Answer the questions in "### Problem Description" applied to a security incident graph.

(4) Based on the security incident graph image, is there anything else that you can tell me in terms of the severity of the incident?

(5) Provide any next steps that you would suggest as a cybersecurity analyst to continue investigating this security incident.

Your reply should:

Be objective, factual, and unbiased. Do not make assumptions or judgments about the customer or their situation.

Answer the customer's question or address their request or concern I f you do not have the answer or the solution, specify so.

Be honest and truthful. Do not give false or misleading information or promises that you cannot keep.

A security incident graph description and security incident graph image may be provided beneath the respective headers in the above example, though these are not shown. FIG. 5 shows an example of a security incident graph, and is described below.

Figure 4D:
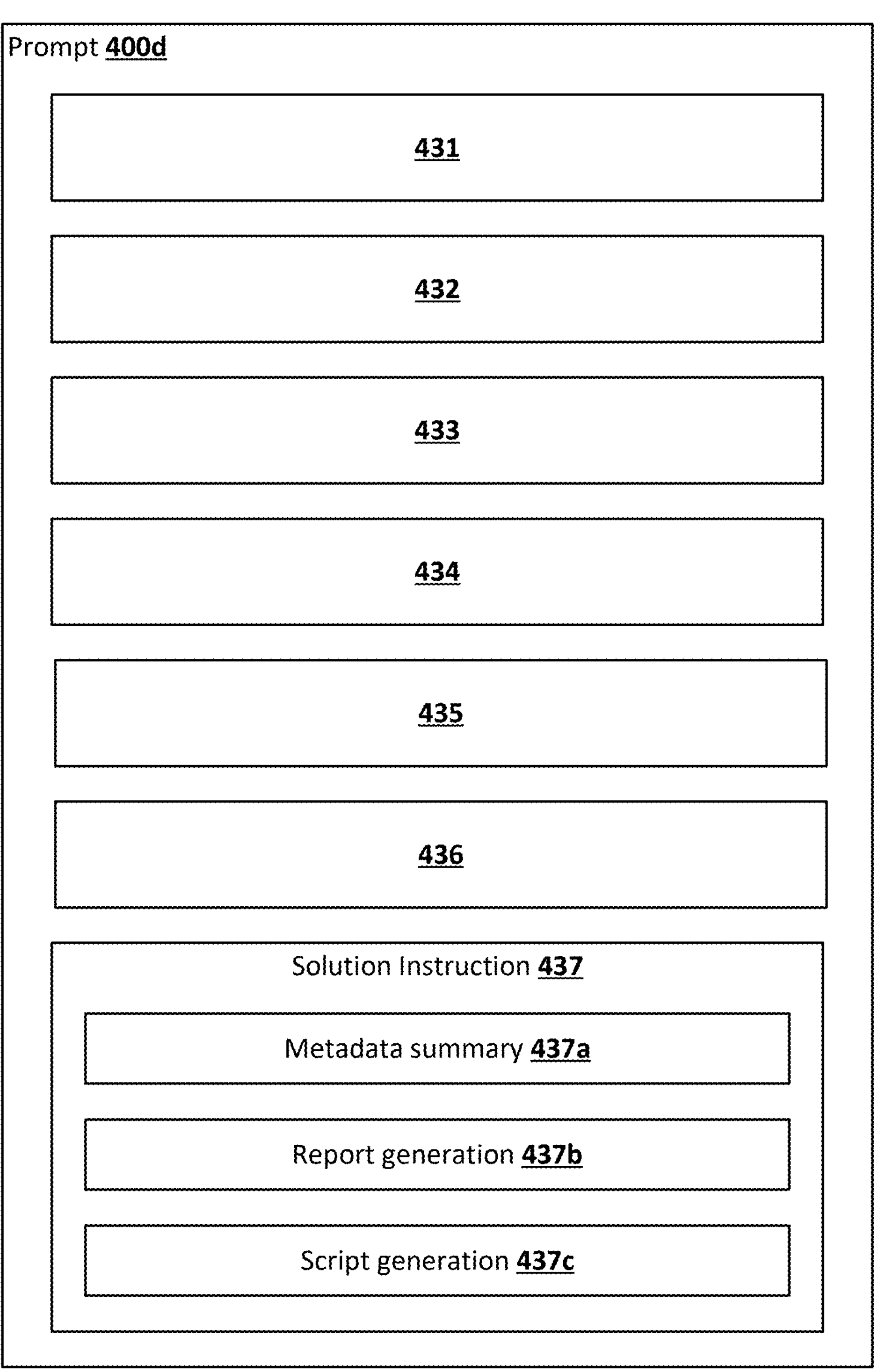
FIG. 4*d* shows a block diagram representing a fourth example prompt.

FIG. 4*d* shows a fourth example mitigation prompt 400*d*. The fourth example mitigation prompt 400*d* comprises a mitigation instruction and a code generation instruction. The mitigation instruction may instruct the MGM to generate a multi-modal output comprising generated text data and generated image data and indicating a cybersecurity mitigation action. The code generation instruction instructs the MGM to generate computer-readable code, e.g., automation script, based on the multi-modal output.

The fourth example prompt 400*d* comprises a problem description 431. Generated text content describing a security threat is provided at a block 432. A security image description is provided at a block 433. The security image description provides a generated text description of a security image provided, wherein the security image is provided at a block 434. Text metadata is provided at block 435. The text metadata may comprise an output generated by the MGM in response to a prompt of the type exemplified in FIG. 4*b*, e.g., Prompt #2. Image metadata is provided at a block 436. The image metadata may comprise an output generated by the MGM in response to a prompt of the type exemplified in FIGS. 4*a* and/or 4*c*, e.g., Prompt #1 and/or Prompt #3 respectively.

A solution instruction is provided at block 437. The solution instruction comprises a plurality of output elements 437*a*-437*c*. Output elements 437*a-c* may respectively request that the MGM provide a summary 437*a* of the metadata in blocks 435 and 436, generate a report summarizing findings 437*b*, and generate a script to automate the threat mitigation 437*c*. output element 437*c* represents an example of a code generation instruction.

Prompt #4 is an example of a prompt of the type shown in FIG. 4*d*. Prompt #4 is provided below:

Prompt #4

Generating Report and Automation Script from the Metadata

Problem Description

During their involvement in active research and hunting tasks, the intelligence analysts will gather hastily written materials called 'fusion content' to document their discoveries.

Fusion content includes for examples detailed description of threat actors or activity profiles. The objective is then to assemble this fusion content to produce a final report called "finished content" (e.g. "Threat Analytics", "Actor Profile" and "Blog posts").

Generating these reports is laborious and time consuming.

Security Images and graphics/charts of all stripes represent an important part of "fusion content" used by analysts to write the final reports.

These graphics include, but are not limited to: attack chain diagrams, bar/line plots, maps, source code and sometimes screenshots of images/texts used by threat groups The goal is to speed up the process of writing and support the intelligence analysts in generating TI reports quickly This can be achieved by generating descriptions of images/graphics related to different Tis The entire threat report textual content is provided in the "### Text Content" section. The description of the security image is provided in the section "### Security Image Description" and the image is provided in the section "### Security Image". The metadata extracted from the text is provided in the "### Text Metadata" section. The metadata extracted from the images are provided in "### Image Metadata" section. The required solution output format is provided in the section "### Solution Instruction"

Text Content
Security Image Description
Security Image
Text Metadata
Image Metadata
Solution Instruction Your solution should be in the following format.

(1) Provide a summary of all the metadata extracted from the above content (2) Generate a report in less than 1000 words summarizing all the findings from the textual and the image data (3) If there is a mitigation step suggested in the text metadata section, generate a script to automate the threat mitigation.

In some examples, each of the example prompts 400_a_-400_d_ of FIGS. 4_a_-4_d_ respectively, e.g., prompts #1-#4, may be provided in a single chat session. In other examples each prompt may be provided in a separate chat session with the MGM.

Generating a security report and an automation script may be done by separately submitting example mitigation prompts #1-#3 to an instance of the MGM 20, collecting the outputs, and constructing prompt #4, which comprises the mitigation instruction for generating a report, and the code generation instruction.

Figure 6:
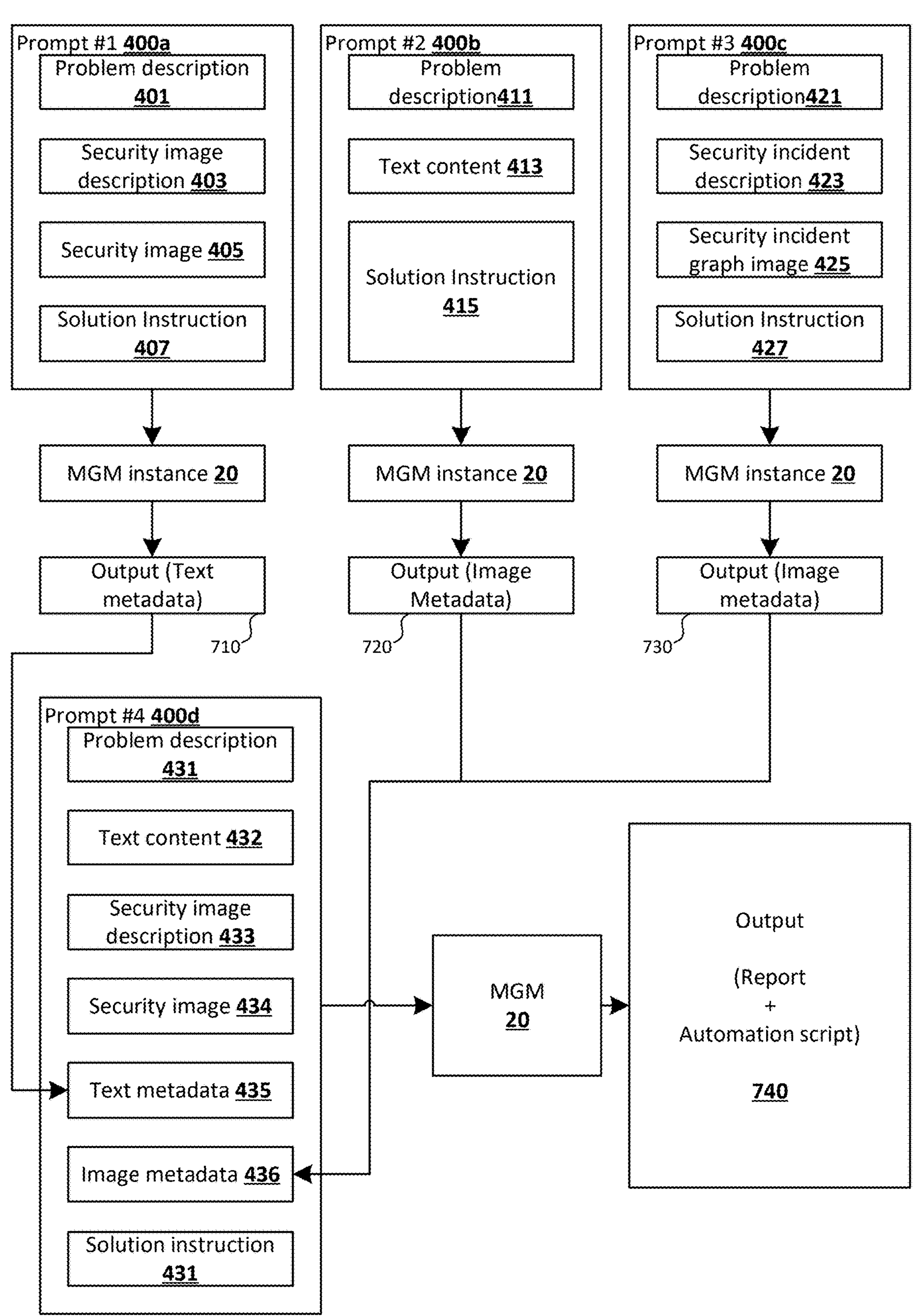
FIG. 6 shows a block diagram representing input of prompts to respective instances of a generative ML model

FIG. 6 illustrates this process. The same reference numerals as in FIGS. 4_a_-4_d_ are used to denote like features in FIG. 6. FIG. 6 represents prompts #1-#3 (400_a_-400_c_) being submitted to respective instances of the MGM to generate respective outputs 710, 720, 730. Output 710 comprises text metadata related to prompt #1 400_a_, output 720 comprises image metadata related to the security image of prompt #2 400_b_, and output 730 comprises image metadata 730 related to the security incident graph of prompt #3 400_c_.

Prompt #4 400_d_ is constructed using the outputs 710, 720, 730. Block 435 of prompt #4 400_d_ comprises text metadata of output 710, and block 436 of prompt #4 400_d_ comprises image metadata from outputs 720 and 730.

Prompt #4 400_d_ is submitted to the MGM to generate an output 740, which comprises an output multi-modal security report and an automation script.

It will be appreciated that the prompt features described above are provided by way of example only. In other examples, other prompt structures may be implemented, with different numbers and types of blocks, output elements (requests to the model) etc. In some cases, as described above, single-shot or few-shot examples may be provided as part of an input prompt. Few shot examples may contain input and outputs, for example text+image and a desired output IoCs. The objective of few-shot examples is to provide the model with samples of input and output pairs, enabling the model to generalize better, perform tasks with minimal instances, and adapt quickly from limited data.

Reference is made by way of example to FIG. 5, which shows a first exemplary security incident graph 500. A security incident graph is an example of a type of image that may be provided as part of an input prompt 400. Incident graph 500 represents two alert nodes 501, and a plurality of entities 503 associated with the alert nodes 501. A first entity 503_a_ is a service, for example a cloud-hosted computer service. Entities 504_b_-503_f_ represent users of the service 503_a_. Communicative links between the alert nodes 501 and the service 503_a_ are represented as solid lines therebetween. Associative relationships between user entities 503_b_-503_f_ are represented by dashed lines.

Figure 7:
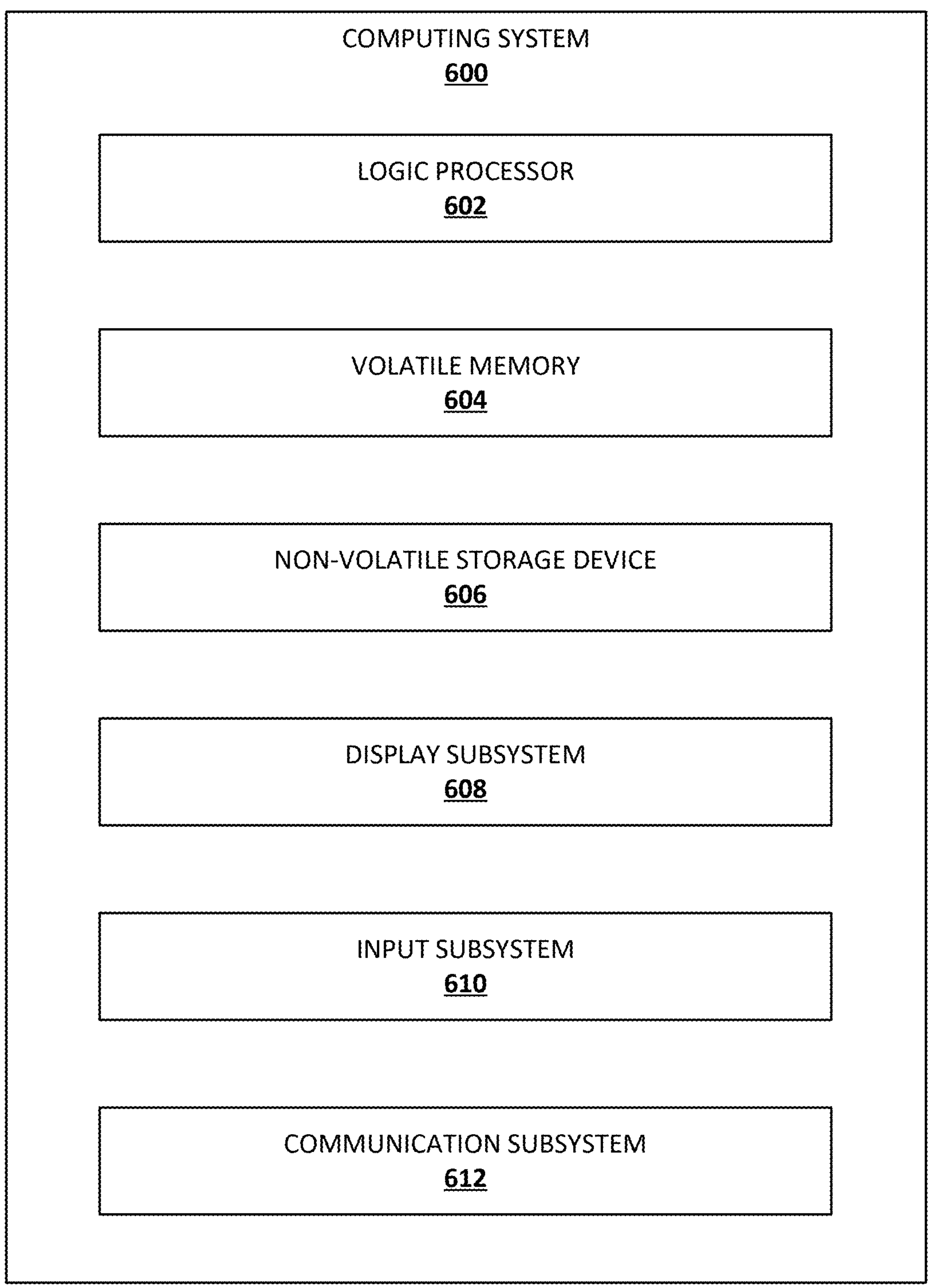
FIG. 7 shows a highly schematic block diagram of an exemplary computing system which may be used to implement techniques described herein.

FIG. 7 schematically shows a non-limiting example of a computing system 600, such as a computing device or system of connected computing devices, that can enact one or more of the methods or processes described above, including the pipeline processes described above with reference to FIG. 2_c_.

Computing system 600 is shown in simplified form. Computing system 600 includes a logic processor 602, volatile memory 604, and a non-volatile storage device 606. Computing system 600 may optionally include a display subsystem 608, input subsystem 610, communication subsystem 612, and/or other components not shown in the drawings below.

Logic processor 602 comprises one or more physical (hardware) processors configured to carry out processing operations. For example, the logic processor 602 may be configured to execute instructions that are part of one or more applications, programs, routines, libraries, objects, components, data structures, or other logical constructs. The logic processor 602 may include one or more hardware processors configured to execute software instructions based on an instruction set architecture, such as a central processing unit (CPU), graphical processing unit (GPU) or other form of accelerator processor. Additionally or alternatively, the logic processor 602 may include a hardware processor(s)) in the form of a logic circuit or firmware device configured to execute hardware-implemented logic (programmable or non-programmable) or firmware instructions.

Processor(s) of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 602 may be virtualized and executed by remotely accessible, networked computing devices configured in a cloud-computing configuration. In such a case, these virtualized aspects are run on different physical logic processors of various different machines.

Non-volatile storage device 606 includes one or more physical devices configured to hold instructions executable by the logic processor 602 to implement the methods and processes described herein. When such methods and processes are implemented, the state of non-volatile storage device 606 may be transformed—e.g., to hold different data. Non-volatile storage device 606 may include physical devices that are removable and/or built-in. Non-volatile storage device 606 may include optical memory (e g., CD, DVD, HD-DVD, Blu-Ray Disc, etc.), semiconductor memory (e g., ROM, EPROM, EEPROM, FLASH memory, etc.), and/or magnetic memory (e.g., hard-disk drive), or other mass storage device technology.

Non-volatile storage device 606 may include nonvolatile, dynamic, static, read/write, read-only, sequential-access, location-addressable, file-addressable, and/or content-addressable devices. Volatile memory 604 may include one or more physical devices that include random access memory.

Volatile memory 604 is typically utilized by logic processor 602 to temporarily store information during processing of software instructions. Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms “module,” “program,” and “engine” may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604.

Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms “module,” “program,” and “engine” may encompass individual or groups of executable files, data files, libraries, drivers, scripts, database records, etc. When included, display subsystem 608 may be used to present a visual representation of data held by non-volatile storage device 606. The visual representation may take the form of a graphical user interface (GUI). As the herein-described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the internet.

The term computer readable media as used herein may include computer storage media. Computer storage media may include volatile and non-volatile, removable and non-removable media (e.g., volatile memory 604 or non-volatile storage 606) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 600 or a component device thereof).

Computer storage media does not include a carrier wave or other propagated or modulated data signal. Communication media may be embodied by computer readable instructions, data structures, program modules, or other data in a modulated data signal, such as a carrier wave or other transport mechanism, and includes any information delivery media. The term “modulated data signal” may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

It will be appreciated that the above embodiments have been disclosed by way of example only. Other variants or use cases may become apparent to a person skilled in the art once given the disclosure herein. The scope of the present disclosure is not limited by the above-described embodiments, but only by the accompanying claims.

In accordance with a first example of the present disclosure, there is provided a computer-implemented method, comprising:

receiving a first security image and a ground truth indicator of compromise (IoC) associated with the first security image;

inputting to a generative machine learning (ML) model at least one training prompt, the at least one training prompt comprising the first security image and an IoC prediction instruction pertaining to the first security image;

receiving a predicted IoC generated by the generative ML model based on the at least one training prompt;

updating a parameter of the generative ML model based on a training loss function that quantifies error between the ground truth IoC and the predicted IoC;

receiving a second security image pertaining to a system;

inputting to the generative ML model at least one mitigation prompt comprising the second security image and a mitigation instruction pertaining to the second security image;

receiving an indication of a cybersecurity mitigation action generated by the generative ML model based on the at least one mitigation prompt;

causing the cybersecurity mitigation action to be performed on the system.

In some examples, the generative ML model is multi-modal, wherein the at least one training prompt comprises first text associated with the first image, wherein the at least one mitigation prompt comprises second text associated with the second security image.

In some examples, the second security image is received from a cybersecurity detector deployed in the system, the second security image having been generated by the cybersecurity detector in response to a cyberthreat detected in the system.

In some examples, the second security image comprises a visual incident graph, the visual incident graph comprising an alert node representing the cybersecurity threat and a plurality of entity nodes representing entities associated with the cybersecurity threat.

In some examples, the at least one mitigation prompt comprises an extraction instruction that instructs the ML generator to extract a security insight based on a connection between an entity node and the alert node in the second security image, wherein the mitigation instruction instructs the ML generator to determine the mitigation action based on the security insight.

In some examples, the generative model is multi-modal, wherein the at least one mitigation prompt comprises third text associated with the cybersecurity threat, and wherein the extraction instruction instructs the ML generator to extract the security insight based on the third text.

In some examples, the security insight identifies a compromised entity and the cybersecurity mitigation action comprises blocking, quarantining or isolating the compromised entity.

In some examples, the at least one mitigation prompt comprises a code generation instruction, wherein the indication of a cybersecurity mitigation action comprises computer-readable code embodying the cybersecurity mitigation action, the method comprising executing the computer-readable code on at least one processor, which upon execution on the at least one processor causes the cybersecurity mitigation action to be performed.

In some examples, the mitigation instruction instructs the generative ML model to generate a multi-modal output comprising generated text data and generated image data, the multi-modal output indicating the cybersecurity mitigation action, wherein the code generation instruction instructs the generative ML model to generate the computer-readable code based on the multi-modal output.

In some examples, the at least one mitigation prompt comprises:

- a first mitigation prompt comprising the extraction instruction, and
- a second mitigation prompt comprising the mitigation instruction and the code generation instruction.

In some examples, the first mitigation prompt is input to the generative ML model in a first chat session, and the second mitigation prompt is input to the generative ML model in a second chat session.

In some examples, responsive to the mitigation instruction, the generative ML model generates a multi-modal output comprising generated text data and generated image data, the multi-modal output indicating the cybersecurity mitigation action.

In accordance with a second example of the present disclosure there is provided a computer system comprising:

at least one memory configured to store computer-readable instructions; and at least one hardware processor coupled to the at least one memory, wherein the computer-readable instructions are configured to cause the at least one hardware processor to:

receive a security image pertaining to a system, the security image comprising a visual incident graph comprising an alert node representing a cybersecurity threat and a plurality of entity nodes representing entities associated with the cybersecurity threat;

receive input to a multi-modal generative ML model of at least one mitigation prompt comprising:

- the security image,
- an extraction instruction that instructs the ML generator to extract a security insight based on the security image,
- a mitigation instruction pertaining to the security image, wherein the mitigation instruction instructs the generative ML model to generate an output indicating a cybersecurity mitigation action, and to determine a mitigation action based on the security insight, and
- a code generation instruction that instructs the generative ML model to generate computer-readable code based on the multi-modal output;

receive an indication of a cybersecurity mitigation action generated by the generative ML model based on the at least one mitigation prompt, the indication of a cybersecurity mitigation action comprising computer-readable code embodying the cybersecurity mitigation action, and execute the computer-readable code on the at least one processor, causing the cybersecurity mitigation action to be performed on the system.

In some examples, the computer-readable instructions are further configured to cause the at least one hardware processor to:

receive a training security image and a ground truth indicator of compromise (IoC) associated with the training security image;

receive input to the generative machine learning (ML) model of at least one training prompt, the at least one training prompt comprising the training security image and an IoC prediction instruction pertaining to the training security image;

receive a predicted IoC generated by the generative ML model based on the at least one training prompt; and update a parameter of the generative ML model based on a training loss function that quantifies error between the ground truth IoC and the predicted IoC.

In some examples, the at least one training prompt comprises training text associated with the training security image.

In some examples, the security image is received from a cybersecurity detector deployed in the system, the security image having been generated by the cybersecurity detector in response to a cyberthreat detected in the system.

In some examples, the security insight identifies a compromised entity, and wherein the computer-readable instructions configured to cause the at least one hardware processor to execute the computer-readable code on the at least one processor cause a cybersecurity mitigation action comprising blocking, quarantining or isolating a compromised entity to be performed.

In some examples, the at least one mitigation prompt comprises:

- a first mitigation prompt comprising the extraction instruction, and a second mitigation prompt comprising the mitigation instruction and the code generation instruction.

In some examples, the computer-readable instructions are further configured to cause the at least one hardware processor to receive the first mitigation prompt as input to the generative ML model in a first chat session, and to receive the second mitigation prompt as input to the generative ML model in a second chat session.

In accordance with a third example of the present disclosure, there is provided computer-readable storage media embodying computer readable instructions, the computer-readable instructions configured upon execution on at least one hardware processor to cause the at least one hardware processor to:

receive a first security image and a ground truth indicator of compromise (IoC) associated with the first security image;

input to a generative machine learning (ML) model at least one training prompt, the at least one training prompt comprising the first security image and an IoC prediction instruction pertaining to the first security image;

receive a predicted IoC generated by the generative ML model based on the at least one training prompt;

update a parameter of the generative ML model based on a training loss function that quantifies error between the ground truth IoC and the predicted IoC;

receive a second security image pertaining to a system;

input to the generative ML model at least one mitigation prompt comprising the second security image and a mitigation instruction pertaining to the second security image;

receive an indication of a cybersecurity mitigation action generated by the generative ML model based on the at least one mitigation prompt;

cause the cybersecurity mitigation action to be performed on the system.

The invention claimed is:

1. A computer-implemented method, comprising:

receiving, from a training set, a first security image and a ground truth indicator of compromise (IoC) associated with the first security image, wherein:

the ground truth IoC is a true reference IoC relating to a particular type or category of cyberthreat;

the first security image comprises a first visual representation of a first cybersecurity threat; and the first visual representation depicts a relationship between an alert corresponding to the first cybersecurity threat and an entity associated with the alert;

inputting, to a generative machine learning (ML) model, at least one training prompt comprising the first security image and an IoC prediction instruction that requests identification of an IoC based on the depicted relationship between the alert and the entity;

receiving a predicted IoC generated by the generative ML model based on the at least one training prompt;

updating a parameter of the generative ML model based on a training loss function that quantifies error between the ground truth IoC and the predicted IoC, wherein the updating produces an updated generative ML model;

receiving a second security image pertaining to a system, wherein:

the second security image comprises a visual incident graph that visualizes a second cybersecurity threat and is generated or collected in response to detection of the second cybersecurity threat; and the visual incident graph comprises an alert node representing the second cybersecurity threat and an entity node representing an entity associated with the alert node;

inputting, to the updated generative ML model, at least one mitigation prompt comprising:

the second security image;

an extraction instruction requesting extraction of a security insight from the visual incident graph; and a mitigation instruction to determine a cybersecurity mitigation action based on the security insight;

receiving an indication of the cybersecurity mitigation action generated by the updated generative ML model based on the at least one mitigation prompt; and causing the cybersecurity mitigation action to be performed on the system.

2. The computer-implemented method of claim 1, wherein:

the generative ML model is multi-modal;

the at least one training prompt comprises first text associated with the first security image; and the at least one mitigation prompt comprises second text associated with the second security image.

3. The computer-implemented method of claim 1, wherein:

the second security image is received from a cybersecurity detector deployed in the system; and the second security image is generated by the cybersecurity detector in response to the second cybersecurity threat.

4. The computer-implemented method of claim 1, wherein:

the at least one training prompt comprises both the first security image and text associated with the first security image; and the generative ML model is configured to jointly process visual features extracted from the first security image and textual features extracted from the text associated with the first security image to identify the predicted IoC.

5. The computer-implemented method of claim 1, wherein the security insight is based on a connection between the entity node and the alert node in the second security image.

6. The computer-implemented method of claim 5, wherein:

the generative ML model is multi-modal;

the at least one mitigation prompt comprises third text associated with the second cybersecurity threat; and the extraction instruction instructs the updated generative ML model to extract the security insight based on the third text.

7. The computer-implemented method of claim 5, wherein the security insight identifies a compromised entity, and the cybersecurity mitigation action comprises blocking, quarantining or isolating the compromised entity.

8. The computer-implemented method of claim 1, wherein:

the at least one mitigation prompt comprises a code generation instruction;

the indication of the cybersecurity mitigation action comprises computer-readable code embodying the cybersecurity mitigation action; and the causing of the cybersecurity mitigation action to be performed comprises executing the computer-readable code.

9. The computer-implemented method of claim 8, wherein the mitigation instruction instructs the updated generative ML model to generate a report comprising generated text data and generated image data indicating the cybersecurity mitigation action, wherein the generated image data comprises at least one of: a security incident diagram, a visual mitigation workflow, or a graphical representation of one or more compromised components; and the code generation instruction instructs the updated generative ML model to generate the computer-readable code based on the generated text data and the generated image data.

10. The computer-implemented method of claim 8, wherein the at least one mitigation prompt comprises:

a first mitigation prompt comprising the extraction instruction, and a second mitigation prompt comprising the mitigation instruction and the code generation instruction.

11. The computer-implemented method of claim 10, wherein the first mitigation prompt is input to the updated generative ML model in a first chat session, and the second mitigation prompt is input to the updated generative ML model in a second chat session.

12. The computer-implemented method of claim 1, wherein:

responsive to the mitigation instruction, the updated generative ML model generates a report comprising generated text data and generated image data, wherein:

the report indicates the cybersecurity mitigation action; and the generated image data comprises at least one of a security incident diagram, a visual mitigation workflow, or a graphical representation of one or more compromised components.

13. A computer system comprising:

a memory configured to store computer-readable instructions; and a hardware processor coupled to the memory, wherein the computer-readable instructions are configured to cause the hardware processor to:

receive a training security image and a ground truth indicator of compromise (IoC) associated with the training security image, wherein:

the ground truth IoC is a true reference IoC relating to a particular type or category of cyberthreat;

the training security image comprises a first visual representation of a first cybersecurity threat; and the first visual representation depicts a relationship between an alert corresponding to the first cybersecurity threat and an entity associated with the alert;

input, to a multi-modal generative machine learning (ML) model, a training prompt comprising the training security image and an IoC prediction instruction that requests identification of an IoC based on the depicted relationship between the alert and the entity associated with the alert;

receive a predicted IoC generated by the generative ML model based on the training prompt; and update a parameter of the generative ML model based on a training loss function that quantifies error between the ground truth IoC and the predicted IoC, wherein the updating produces an updated generative ML model;

receive a security image pertaining to a system, wherein:

the security image comprises a visual incident graph that visualizes a cybersecurity threat and is generated or collected in response to detection of the cybersecurity threat; and the visual incident graph comprises an alert node representing the cybersecurity threat and an entity node representing an entity associated with the cybersecurity threat;

submit, to the updated generative ML model, a mitigation prompt comprising:

the security image;

an extraction instruction requesting extraction of a security insight from the visual incident graph; and a mitigation instruction to determine a cybersecurity mitigation action based on the security insight; and a code generation instruction that instructs the updated generative ML model to generate computer-readable code based on the cybersecurity mitigation action;

receive, from the updated generative ML model and based on the mitigation prompt, the computer-readable code, the computer-readable code embodying the cybersecurity mitigation action; and execute the computer-readable code whereby the cybersecurity mitigation action is performed on the system.

14. The system of claim 13, wherein the training prompt comprises training text associated with the training security image.

15. The system of claim 13, wherein the security image is received from a cybersecurity detector deployed in the system, the security image having been generated by the cybersecurity detector in response to a cyberthreat detected in the system.

16. The system of claim 13, wherein:

the security insight identifies a compromised entity; and the cybersecurity mitigation action includes blocking, quarantining, or isolating a compromised entity.

17. The system of claim 13, wherein the mitigation prompt comprises:

a first mitigation prompt comprising the extraction instruction, and a second mitigation prompt comprising the mitigation instruction and the code generation instruction.

18. The system of claim 17, wherein the computer-readable instructions are further configured to cause the hardware processor to submit the first mitigation prompt as input to the updated generative ML model in a first chat session, and to submit the second mitigation prompt as input to the updated generative ML model in a second chat session.

19. A non-transitory computer storage medium embodying computer-readable instructions, the computer-readable instructions configured upon execution on a hardware processor to cause the hardware processor to:

receive from a training set a first security image and a ground truth indicator of compromise (IoC) associated with the first security image, wherein:

the ground truth IoC is a true reference IoC relating to a particular type or category of cyberthreat;

the first security image comprises a first visual representation of a first cybersecurity threat; and the first visual representation depicts a relationship between an alert corresponding to the first cybersecurity threat and an entity associated with the alert;

input, to a generative machine learning (ML) model, a training prompt comprising the first security image and an IoC prediction instruction that requests identification of an IoC based on the depicted relationship between the alert and the entity;

receive a predicted IoC generated by the generative ML model based on the training prompt;

update a parameter of the generative ML model based on a training loss function that quantifies error between the ground truth IoC and the predicted IoC, wherein the updating produces an updated generative ML model;

receive a second security image pertaining to a system, wherein:

the second security image comprises a visual incident graph that visualizes a second cybersecurity threat and is generated or collected in response to detection of the second cybersecurity threat;

the visual incident graph comprises an alert node representing the second cybersecurity threat and an entity node representing an entity associated with the alert node;

input, to the updated generative ML model, a mitigation prompt comprising:

the second security image;

an extraction instruction requesting extraction of a security insight from the visual incident graph; and a mitigation instruction to determine a cybersecurity mitigation action based on the security insight;

receive an indication of the cybersecurity mitigation action generated by the updated generative ML model based on the mitigation prompt; and cause the cybersecurity mitigation action to be performed on the system.

* * * * *